(12) United States Patent
Astvatsaturov et al.

(10) Patent No.: US 11,720,764 B2
(45) Date of Patent: Aug. 8, 2023

(54) BARCODE READERS WITH 3D CAMERA(S)

(71) Applicant: ZEBRA TECHNOLOGIES CORPORATION, Lincolnshire, IL (US)

(72) Inventors: Yuri Astvatsaturov, Lake Forest, IL (US); Edward Barkan, Miller Place, NY (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/742,757

(22) Filed: May 12, 2022

(65) Prior Publication Data

US 2022/0269876 A1 Aug. 25, 2022

Related U.S. Application Data

(63) Continuation of application No. 16/888,273, filed on May 29, 2020, now Pat. No. 11,334,739.

(51) Int. Cl.
| | |
|---|---|
| *G06K 7/14* | (2006.01) |
| *G06K 7/10* | (2006.01) |
| *G08B 13/196* | (2006.01) |
| *G06V 10/56* | (2022.01) |
| *G06V 20/64* | (2022.01) |
| *G06V 40/10* | (2022.01) |
| *G06F 18/214* | (2023.01) |
| *G06V 10/10* | (2022.01) |
| *G06V 10/82* | (2022.01) |

(Continued)

(52) U.S. Cl.
CPC ....... *G06K 7/1096* (2013.01); *G06F 18/2148* (2023.01); *G06K 7/1417* (2013.01); *G06V 10/17* (2022.01); *G06V 10/22* (2022.01); *G06V 10/56* (2022.01); *G06V 10/82* (2022.01); *G06V 20/647* (2022.01); *G06V 40/107* (2022.01); *G06V 40/161* (2022.01); *G06V 40/172* (2022.01); *G08B 13/19613* (2013.01)

(58) Field of Classification Search
CPC .... G06K 7/1417; G06K 9/6257; G06V 10/56; G06V 10/42
USPC .................................................. 235/462.11
See application file for complete search history.

(56) References Cited

U.S. PATENT DOCUMENTS 11,334,739 B2 * 5/2022 Astvatsaturov ...... G06K 9/6257
11,409,977 B1 * 8/2022 Glaser .................. G06K 7/1491
(Continued)

OTHER PUBLICATIONS

International Search Report and Written Opinion for International Patent No. PCT/US2021/34420 dated Aug. 31, 2021.

*Primary Examiner* — Ahshik Kim
(74) *Attorney, Agent, or Firm* — Yuri Astvatsaturov

(57) ABSTRACT

Methods and systems include using three-dimensional imaging apparatuses to capture three-dimensional images and analyze resulting three-dimensional image data to enhance captured two-dimensional images for scanning related processes such as object identification, symbology detection, object recognition model training, and identifying improper scan attempts or other actions performed by an operator. Imaging systems such as bi-optic readers, handheld scanners, and machine vision systems are described using three-dimensional imaging apparatuses and described capturing three-dimensional images and using with captured two-dimensional images.

19 Claims, 21 Drawing Sheets

(51) Int. Cl.
    *G06V 10/22*     (2022.01)
    *G06V 40/16*     (2022.01)

(56) References Cited

U.S. PATENT DOCUMENTS

| | | | |
|---|---|---|---|
| 11,514,665 | B2* | 11/2022 | Nater ................... G06K 7/1443 |
| 2010/0163628 | A1* | 7/2010 | Olmstead ........... G06K 7/10861 |
| | | | 235/470 |
| 2012/0181329 | A1* | 7/2012 | Gratton ................... G06F 16/00 |
| | | | 235/375 |
| 2013/0223673 | A1 | 8/2013 | Davis et al. |
| 2017/0264880 | A1 | 9/2017 | Zolotov |
| 2017/0300734 | A1 | 10/2017 | Zheng et al. |
| 2018/0285611 | A1 | 10/2018 | D'ercoli et al. |
| 2019/0188451 | A1* | 6/2019 | D'Ercoli .............. G06V 10/457 |
| 2022/0350982 | A1* | 11/2022 | West ................... G06K 7/1417 |

* cited by examiner

BARCODE READERS WITH 3D CAMERA(S)

CROSS-REFERENCE TO RELATED APPLICATION

This application is a continuation of U.S. patent application Ser. No. 16/888,273, filed on May 29, 2020, and incorporated herein by reference in its entirety.

BACKGROUND

Symbology readers, such as handheld barcode readers and bi-optic readers, use two-dimensional images to capture images of objects, for a variety of purposes. In many warehousing, distribution, and retail environments, these symbology readers capture 2D image data which is used to conduct barcode decoding operations. However, in some instances it is desirable to use the 2D image data for other purposes. For example, a bi-optic reader may capture 2D image data from its 2D imager and use that image data to help determine an off-platter weighing condition. In other instances, the bi-optic reader may use 2D image data to help determine the nature of the product being scanned. In yet other instances, the bi-optic reader may use 2D image data to help detect an occurrence of a sweethearting or a spoofing event.

While the use of 2D imagers and 2D image analysis has existed in connection with the aforementioned, and other, purposes, detection success rate could still be improved. Moreover, image analysis that can take place is limited by the fact that the captured image data is two-dimensional. Accordingly, there is a continued need to evolve and develop bi-optic barcode readers, and other symbology readers, to further increase reader performance and to provide readers with new, as yet unavailable functionality.

SUMMARY

In an embodiment, the present invention is a method of barcode scanning using a barcode reader. The method includes capturing, using a two-dimensional (2D) imaging apparatus within the barcode reader and having a first field of view (FOV), a 2D image of a first environment appearing within the first FOV and storing 2D image data corresponding to the 2D image. The method further includes capturing, using a three-dimensional (3D) imaging apparatus associated with the barcode reader and having a second FOV that overlaps at least partially with the first FOV, a 3D image of a second environment appearing within the second FOV and storing 3D image data corresponding to the 3D image. The method further includes identifying one or more 3D image features within the second environment from the 3D image data; and enhancing the 2D image data, resulting in enhanced 2D image data, by correlating the one or more 3D image features to at least one or more 2D image features in the 2D image data. From there, the method includes processing the enhanced 2D image data to at least one of (a) decode a barcode captured within the enhanced 2D image data, (b) train an object recognition model with the enhanced 2D image data, (c) recognize an object within the enhanced 2D image data, (d) identify an action performed by an operator of the barcode reader, and (e) change at least one parameter associated with the barcode reader operation.

In a variation of this embodiment, the 3D image data comprises 3D point cloud data and the one or more 3D image features includes one or more geometric features of an object presented within the second FOV. In another variation of this method, the 3D image data comprises 3D point cloud data and the one or more 3D image features includes a color or a color gradation corresponding an object presented within the second FOV. In yet another variation of the embodiment, identifying the one or more 3D image features includes identifying the one or more 3D image features that are positioned within a predetermined distance range away from the 3D imaging apparatus. In some variations, enhancing the 2D image data further includes filtering the at least one or more 2D image features such that the processing the enhanced 2D image data excludes processing of image data associated with the at least one or more 2D image features. In some variations, enhancing the 2D image data further includes filtering the at least one or more 2D image features such that the processing the enhanced 2D image data is limited to processing of image data associated with the at least one or more 2D image features. In some variations, the barcode reader is a stationary barcode reader configured to be positioned within a workstation and operated by the operator, and the predetermined distance range away from the 3D imaging apparatus extends from the 3D imaging apparatus to an edge of the workstation proximate the operator. In some variations, the barcode reader is a bi-optic barcode reader having a product-scanning region, and the predetermined distance range away from the 3D imaging apparatus extends from the 3D imaging apparatus to a distal boundary of the product-scanning region.

In another variation of the embodiment, the one or more 3D image features includes at least one of (i) at least a portion of an operator's hand, and (ii) an object grasped by the operator's hand.

In another variation of the embodiment, the processing the enhanced 2D image data includes the identifying the action performed by the operator, and responsive to the action performed by the operator being identified as one of presenting an object within a product-scanning region and presenting the object proximate to the product-scanning region, and further responsive to no barcode being detected within at least one of the 2D image data and the enhanced 2D image data, generating an alert suitable for signaling a potential theft event.

In another variation of this embodiment, processing the enhanced 2D image data includes identifying the action performed by the operator, and responsive to the action performed by the operator being identified as one of presenting an object within a product-scanning region and presenting the object proximate to the product-scanning region, and detecting a partially covered barcode or fully covered barcode on the object within at least one of the 2D image data and the enhanced 2D image data, generating an alert suitable for signaling a potential theft event.

In another variation of this embodiment, the at least one parameter associated with the barcode reader operation is an exposure time of the barcode reader, an illumination pulse duration of the barcode reader, a focus position of the barcode reader, an imaging zoom level of the barcode reader, and an illumination source of the barcode reader. In an example, the illumination source is a diffuse illumination source or a direct illumination source.

In another variation of this embodiment, in response to identifying the one or more 3D image features within the second environment from the 3D image data, adjusting an illumination brightness of the barcode reader prior to capturing the 2D image of the first environment.

In another embodiment, the present invention is a method processing data using a barcode reader. The method includes capturing, using a two-dimensional (2D) imaging apparatus within the barcode reader and having a first field of view (FOV), a 2D image of a first environment appearing within the first FOV and storing 2D image data corresponding to the 2D image. The method further includes capturing, using a three-dimensional (3D) imaging apparatus associated with the barcode reader and having a second FOV that overlaps at least partially with the first FOV, a 3D image of a second environment appearing within the second FOV and storing 3D image data corresponding to the 3D image. The method further includes identifying one or more 2D image features within the first environment from the 2D image data; and enhancing the 3D image data, resulting in enhanced 3D image data, by correlating the one or more 2D image features to at least one or more 3D image features in the 3D image data. From there, the method includes processing the enhanced 3D image data to at least one of (a) train an object recognition model with the enhanced 3D image data, (b) recognize an object within the enhanced 3D image data, (c) identify an action performed by a user of the barcode reader, and (d) change at least one parameter associated with the 3D imaging apparatus.

In a variation of this embodiment, the 2D image data comprises one of monochrome image data, grayscale image data, and polychrome image data, and the one or more 2D image features includes at least one of a barcode and one or more geometric features of an object presented within the first FOV.

In another variation of this embodiment, the one or more 2D image features includes the barcode, and the enhancing the 3D image data includes mapping a location of the barcode from the 2D image data to the 3D image data. In another variation of this embodiment, the 2D image data comprises polychrome image data, the one or more 2D image features includes the one or more geometric features of the object presented within the first FOV, and enhancing the 3D image data includes mapping at least a portion of the polychrome image data to the 3D image data based at least in part on the one or more geometric features of the object presented within the first FOV. In another variation of this embodiment, enhancing the 3D image data further includes filtering the at least one or more 3D image features such that the processing the enhanced 3D image data excludes processing of image data associated with the at least one or more 3D image features. In another variation of this embodiment, enhancing the 3D image data further includes filtering the at least one or more 3D image features such that the processing the enhanced 3D image data is limited to processing of image data associated with the at least one or more 3D image features. In another variation of this embodiment, enhancing the 3D image data further includes filtering the 3D image databased on a predetermined distance range away from the 3D imaging apparatus.

In another variation of this embodiment, the barcode reader is a stationary barcode reader configured to be positioned within a workstation and operated by the operator, and the predetermined distance range away from the 3D imaging apparatus extends from the 3D imaging apparatus to an edge of the workstation proximate the operator. In another variation of this embodiment, the barcode reader is a bi-optic barcode reader having a product-scanning region, and the predetermined distance range away from the 3D imaging apparatus extends from the 3D imaging apparatus to a distal boundary of the product-scanning region.

In another variation of this embodiment, the one or more 2D image features includes at least one of (i) at least a portion of an operator's hand, and (ii) an object grasped by the operator's hand.

In another variation of this embodiment, processing the enhanced 3D image data includes the identifying the action performed by the operator, and responsive to the action performed by the operator being identified as one of presenting an object within a product-scanning region and presenting the object proximate to the product-scanning region, and further responsive to no barcode being detected within the 2D image data generating an alert suitable for signaling a potential theft event.

In another variation of this embodiment, identifying the one or more 2D image features includes identifying environmental features on the 2D image, wherein the environmental features are features in the image outside of an object presented within the first FOV; converting the environmental features into masking features configured to cover the identified environmental features in the 2D image; and identifying the masking features as the one or more 2D image features.

In another variation of this embodiment, identifying one or more 2D image features comprises: identifying a barcode for the object in the 2D image data; decoding the barcode to generate barcode payload data and determining object identification from the barcode payload data; and determining, from the objecting identification, the one or more 2D image features.

In another variation of this embodiment, processing the enhanced 3D image data to train the object recognition model with the enhanced 3D image data includes: identifying a barcode in the 2D image data, determining a barcode detection event timeframe, and training the object recognition model with the enhanced 3D image data corresponding to the barcode detection event timeframe; or identifying a barcode in the 2D image data, identifying the object within the enhanced 3D image data corresponding to the barcode in the 2D image data, and upon identifying other object in the 3D image not corresponding to the barcode, removing the other objects from the enhanced 3D image data before training the object recognition model with the enhanced 3D image data.

In another variation of this embodiment, the at least one parameter associated with the 3D imaging apparatus comprises a projected amount of illumination of the 3D imaging apparatus, a projected direction of illumination of the 3D imaging apparatus, or a source of illumination for the 3D imaging apparatus.

In another embodiment, the present invention is a method of identifying a proper scanning of an object or an improper scanning of the object using a barcode reader. The method includes capturing, using a two-dimensional (2D) imaging apparatus within the barcode reader and having a first field of view (FOV), a 2D image of a first environment appearing within the first FOV and storing 2D image data corresponding to the 2D image. The method further includes capturing, using a three-dimensional (3D) imaging apparatus associated with the barcode reader and having a second FOV that overlaps at least partially with the first FOV, a 3D image of a second environment appearing within the second FOV and storing 3D image data corresponding to the 3D image. The method further includes determining a first object identification of the object using the 2D image data and determining a second object identification of the object using the 3D image data. From there, the method includes comparing the first object identification with the second object identification, and determining (a) the proper scanning of the object when the first object identification matches the second object identification and (b) the improper scanning of the object when the first object identification does not match the second object identification.

In a variation of this embodiment, determining the first object identification of the object using the 2D image data comprises: identifying a barcode for the object in the 2D image data; and decoding the barcode to generate barcode payload data and determining the first object identification from the barcode payload data.

In a variation of this embodiment, determining the first object identification of the object using the 2D image data comprises: providing the 2D image data to a trained object recognition model; and producing, using the trained object recognition model, the first object identification of the object.

In a variation of this embodiment, determining the second object identification of the object using the 3D image data comprises: providing the 3D image data to a trained object recognition model; and producing, using the trained object recognition model, the second object identification of the object.

In a variation of this embodiment, before determining the first object identification of the object using the 2D image data, the method further includes: comparing the 3D image data to the 2D image data; and removing environmental features outside of the object from the 2D image data based on the 3D image data.

In a variation of this embodiment, before determining the second object identification of the object using the 3D image data, the method includes: comparing the 3D image data to the 2D image data; and removing environmental features outside of the object from the 3D image data based on the 2D image data.

In a variation of this embodiment, determining the second object identification of the object using the 3D image data comprises: determining one or more color features of the object from the 3D image data; and determining the second object identification from the one or more color features.

In a variation of this embodiment, the one or more color features comprise a color of the object.

In a variation of this embodiment, the one or more color features comprise a color gradient of the object.

In a variation of this embodiment, wherein determining the second object identification of the object using the 3D image data comprises: determining one or more geometric features of the object from the 3D image data; and determining the second object identification from the one or more geometric features.

In a variation of this embodiment, determining the first object identification of the object using the 2D image data comprises: identifying a barcode for the object in the 2D image data; and decoding the barcode to generate barcode payload data and determining the first object identification from the barcode payload data.

In a variation of this embodiment, the 3D image data includes a point cloud comprising a plurality of data points, each of the data points having a distance value associated with a distance from the 3D imaging apparatus, and determining the one or more geometric features of the object from the 3D image data is based on a first subset of the 3D image data and is not based on a second subset of the 3D image data, the first subset of the 3D image data being associated with a first subset of the data points having the respective distance value associated with the distance from the 3D imaging apparatus being within a predetermined range, the second subset of the 3D image data being associated with a second subset of the data points having the respective distance value associated with the distance from the 3D imaging apparatus being outside of the predetermined range.

In a variation of this embodiment, responsive to the determining (a) the proper scanning of the object, the method further comprises processing a transaction log to include the data associated with the object, and responsive to the determining (b) the improper scanning of the object, the method further comprises at least one of (i) generating an alert suitable for signaling a potential theft event, and (ii) processing the transaction log to not include the data associated with the object.

In another embodiment, a method of identifying a an improper scanning of the object using a barcode reader, the method includes: capturing, using a two-dimensional (2D) imaging apparatus within the barcode reader and having a first field of view (FOV), a 2D image of a first environment appearing within the first FOV and storing 2D image data corresponding to the 2D image; capturing, using a three-dimensional (3D) imaging apparatus associated with the barcode reader and having a second FOV that overlaps at least partially with the first FOV, a 3D image of a second environment appearing within the second FOV and storing 3D image data corresponding to the 3D image; identifying a scannable object using the 3D image data; and upon failing to determine an object identification of the object using the 2D image data, determining an improper scanning of the object and generating an alarm signal.

In another embodiment, the present invention is a method of operating a barcode reader. The method includes capturing, using a three-dimensional (3D) imaging apparatus within the barcode reader and having a first FOV, a 3D image of a first environment appearing within the first FOV and storing 3D image data corresponding to the 3D image; performing facial recognition on the 3D image data and identifying a presence of facial data in the 3D image data; and in response to the identifying the presence of the facial data, adjust at least one operating parameter of a two-dimensional (2D) imaging apparatus within the barcode reader.

In a variation of this embodiment, the barcode reader is a presentation barcode reader, and the adjust the at least one operating parameter of the 2D imaging apparatus includes reducing intensity of at least one of an illumination assembly and an aiming assembly.

In a variation of this embodiment, wherein the barcode reader is a presentation barcode reader, and wherein the adjust the at least one operating parameter of the 2D imaging apparatus includes preventing activation of at least some portion of the 2D imaging apparatus until a subsequent performing of facial recognition on a subsequent 3D image data associated with a subsequent 3D image fails to identify another presence of facial data in the subsequent 3D image data.

In a variation of this embodiment, the method further includes capturing a 2D image of an object, using the 2D imaging apparatus adjusted according to the at least one operating parameter, and decoding a barcode in the 2D image to identify the object.

In a variation of this embodiment, identifying presence of the facial data in the 3D image data comprises determining a position of the facial data in a first FOV of the 3D imaging apparatus, and wherein the adjusting the operating parameters of the 2D imaging apparatus comprises adjusting the operating parameters based on the position of the facial data.

In a variation of this embodiment, the operating parameters comprises a second FOV of the 2D imaging apparatus.

In a variation of this embodiment, the operating parameters comprises a focal distance of the 2D imaging apparatus.

In a variation of this embodiment, the at least one operating parameter of the 2D imaging apparatus is an exposure time, an illumination pulse duration, or an imaging zoom level.

In another embodiment, a method of operating a barcode reader, the method includes: capturing, using a two-dimensional (2D) imaging apparatus within the barcode reader and having a first field of view (FOV), a 2D image of a first environment appearing within the first FOV and storing 2D image data corresponding to the 2D image; performing facial recognition on the 2D image data and identifying a presence of facial data in the 2D image data; capturing, using a three-dimensional (3D) imaging apparatus within the barcode reader and having a first FOV, a 3D image of a second environment appearing within the first FOV and storing 3D image data corresponding to the 3D image; and in response to identifying one or more 3D image features associated with the facial data in 2D image data, performing at least one of (a) determining a distance of the facial data from the barcode reader and selectively disabling/enabling scanning of the barcode reader based on the distance, (b) determining anthropometric data for the facial data and determining if facial data is from a person or not, and (c) adjust at least one operating parameter of the 2D imaging apparatus within the barcode reader.

In a variation of this embodiment, the at least one operating parameter of the 2D imaging apparatus is an exposure time, an illumination pulse duration, a focus position, or an imaging zoom level.

In a variation of this embodiment, identifying presence of the facial data in the 3D image data comprises determining a position of the facial data in a first FOV of the 3D imaging apparatus, and the adjusting the operating parameters of the 2D imaging apparatus comprises adjusting the operating parameters based on the position of the facial data.

In another embodiment, the present invention is a method of operating point-of-sale scanning station having a barcode reader. The method includes: capturing, using a three-dimensional (3D) imaging apparatus associated with the point-of-sale scanning station and having a first FOV, a 3D image of a first environment appearing within the first FOV and storing 3D image data corresponding to the 3D image. The method further includes performing facial recognition on the 3D image data and identifying a presence of facial data in the 3D image data; and performing a facial identification on the facial data and authenticating the facial identification; and responsive to authenticating the facial identification, at least one of (a) capturing a two-dimensional (2D) image of an object using a 2D imaging apparatus within the barcode reader and decoding a barcode in the 2D image to identify the object and (b) satisfying a release condition to either prevent a decode of a barcode captured in image of 2D image or to prevent adding a subsequently scanned item to a transaction log of scanned items.

In a variation on this embodiment, authenticating the facial identification comprises comparing the facial identification to an authorized user database. In a variation on this embodiment, wherein the authenticating the facial identification comprises determining that the facial data is at an acceptable position within the first FOV of the 3D imaging apparatus. In a variation on this embodiment, before the performing facial recognition on the 3D image data and the identifying the presence of the facial data in the 3D image data, the method includes: identifying environmental features in the 3D image data, the environmental features being features in the 3D image outside of the object; and removing environmental features from the 3D image data.

In another embodiment, a machine vision method includes capturing, using a two-dimensional (2D) imaging apparatus, a 2D image of an object, identifying a barcode of the object in the 2D image, and determining one or more three-dimensional (3D) object features of the object from the barcode in the 2D image. The method further includes capturing, using a three-dimensional (3D) imaging apparatus of the machine vision system, a 3D image of an environment and storing 3D image data corresponding to the 3D image. The method includes examining the 3D image data for a presence of the one or more 3D object features; in response to determining that at least one of the one or more 3D object features is absent from the 3D image data, providing a digital fault detection signal to a user of the machine vision system and in response to determining that at least one of the one or more 3D object features is present from the 3D image data changing at least one parameter associated with the machine vision system.

In some variations of this method, determining the one or more 3D object features of the object from the barcode in the 2D image, comprises: decoding the barcode to generate barcode payload data and determining object identification from the barcode payload data; and determining, from the objecting identification, the one or more 3D object features of the object. In some variations of this method, determining the one or more 3D object features of the object from the barcode in the 2D image, comprises: determining an orientation of the object from a location of the barcode in the 2D image; and determining, from the orientation of the object, the one or more 3D object features as a subset of available 3D object features within the first FOV.

In some variations of this method, the one or more 3D object features is at least one of a dimensional feature and a shape feature.

In another variation of this embodiment, changing at least one parameter associated with the machine vision system comprises changing an exposure time of a 2D imaging apparatus of the machine vision system, an illumination pulse duration of an illumination assembly of the machine vision system, a focal position of the 2D imaging apparatus of the machine vision system, an imaging zoom level of the 2D imaging apparatus, an illumination brightness, an illumination wavelength, or an illumination source of the machine vision system. In some such embodiments, the illumination source is a diffuse illumination source or a direct illumination source. In some such embodiments, changing the illumination source comprises changing from an illumination source emitting at a first wavelength to an illumination source emitting at a second wavelength, different than the first wavelength.

In another embodiment, the present invention is a scanning station. The scanning station includes a two-dimensional (2D) imaging apparatus configured to: capture a 2D image of an object in a field of view (FOV) of the 2D imaging apparatus; identify a barcode in the 2D image; and identify the object from a barcode payload. The scanning station further includes a 3D imaging apparatus configured to: capture a 3D image of the object in a FOV of the 3D imaging apparatus; and generate 3D image data from the 3D image. The scanning station further includes a processor and memory storing instructions that, when executed, cause the processor to: identify one or more 3D object features from the 3D image data; evaluate the one or more 3D object features against an identity of the object; and responsive to evaluating the one or more 3D object features against the identity of the object, adjust an operating parameter of the scanning station.

In a variation of this embodiment, the 3D image data comprises 3D point cloud data and the one or more 3D object features comprise at least one of geometric features of the object, color of the object, color gradation of the object. In another variation of this embodiment, the 3D image data comprises 3D point cloud data and the one or more 3D object features comprise a position of the object in the FOV of the 3D imaging apparatus. In some variations, the memory further stores instructions that, when executed, cause the processor to: determine if the position of the object in the FOV or the 3D imaging apparatus is in an acceptable range for capturing the 2D image of the object using the 2D imaging apparatus; and in response to the position of the object in the FOV of the 3D imaging apparatus not being in the acceptable range, abstain from capturing a subsequent 2D image by the 2D imaging apparatus, until a release condition is satisfied.

In another variation of this embodiment, the operating parameter comprises at least one of an illumination intensity of an illumination apparatus in the 2D imaging apparatus, a FOV of the 2D imaging apparatus, and a focal distance of the 2D imaging apparatus. In another variation of this embodiment, the scanning station is a bi-optic scanner having a tower portion and a platter portion. In some variations, the 3D imaging apparatus is one of the tower portion and the platter portion and the 2D imaging apparatus is in the other of the tower portion and the platter portion. In some variations, the 3D imaging apparatus and the 2D image apparatus are both in one of the tower portion and the platter portion.

In some variations, the scanning station further includes a weigh platter within the platter portion, the weigh platter configured to measure, via a weighing module, a weight of an object placed on the weigh platter, the weigh platter having a weighing surface, and the memory further stored instructions that, when executed, cause the processor to: determine, from the 3D image data, a position of the object relative to the weigh platter; and in response to the position of the object relative to the weigh platter being in a weigh platter fault position, modifying operation of the weighing module from a first state to a second state, until a release condition is satisfied. In some variations, the first state of the weighing module permits reporting of the weight of the object placed on the weigh platter, and wherein the second state of the weighing module prevents reporting of the weight of the object placed on the weigh platter. In some variations, the weigh platter fault position comprises an overhang position, where at least a portion of the object overhangs the weigh platter. In some variations, the weigh platter fault position comprises a suspended position, where the object is suspended, at least partially, above the weigh platter.

In some variations of this embodiment, the scanning station further includes a weigh platter within the platter portion, the weigh platter configured to measure, via a weighing module, a weight of an object placed on the weigh platter, the weigh platter having a weighing surface, wherein the memory further stored instructions that, when executed, cause the processor to: detect, from the 3D image data, an operator's hand being in contact with the object; and in response to a detection of the operator's hand being in contact with the object, modifying operation of the weighing module from a first state to a second state, until a release condition is satisfied.

In another embodiment, the present invention is a scanning station. The scanning station includes a 2D imaging apparatus configured to capture a 2D image of an object in a field of view of the 2D imaging apparatus and generate 2D image data from the 2D image; and a 3D imaging apparatus configured to capture a 3D image of the object in a field of view of the 3D imaging apparatus and generate 3D image data from the 3D image. The scanning station further includes a processor and memory storing instructions that, when executed, cause the processor to: compare the 3D image data to the 2D image data and performing an authentication process on the object.

In a variation of this embodiment, the memory further stores instructions that, when executed, cause the processor to: determine a first object identification of the object using the 2D image data; determine a second object identification of the object using the 3D image data; and compare the first object identification to the second object identification and determine (a) a proper scanning of the object when the first object identification matches the second object identification and (b) an improper scanning of the object when the first object identification does not match the second object identification. In another variation of this embodiment, the memory further stores instructions that, when executed, cause the processor to determine the first object identification of the object using the 2D image data by: identifying a barcode for the object in the 2D image data; and decoding the barcode to generate barcode payload data and determining the first object identification from the barcode payload data. In another variation of this embodiment, the memory further stores instructions that, when executed, cause the processor to determine the first object identification of the object using the 2D image data by: providing the 2D image data to a trained object recognition model; and producing, using the trained object recognition model, the first object identification of the object.

In some variations, the memory further stores instructions that, when executed, cause the processor to determine the second object identification of the object using the 3D image data by: providing the 3D image data to a trained object recognition model; and producing, using the trained object recognition model, the second object identification of the object. In some variations, the memory further stores instructions that, when executed, cause the processor to, before determining the first object identification of the object using the 2D image data: compare the 3D image data to the 2D image data; and remove environmental features outside of the object from the 2D image data based on the 3D image data. In some variations, the memory further stores instructions that, when executed, cause the processor to, before determining the second object identification of the object using the 3D image data: compare the 3D image data to the 2D image data; and remove environmental features outside of the object from the 3D image data based on the 2D image data. In some variations, the memory further stores instructions that, when executed, cause the processor to determine the second object identification of the object using the 3D image data by: determining one or more color features of the object from the 3D image data; and determining the second object identification from the one or more color features. In some variations, the one or more color features comprise a color of the object. In some variations, the one or more color features comprise a color gradient of the object. In some variations, the memory further stores instructions that, when executed, cause the processor to determine the second object identification of the object using the 3D image data by: determining one or more geometric features of the object from the 3D image data; and determining the second object identification from the one or more geometric features.

In some variations, determining the first object identification of the object using the 2D image data comprises: identifying a barcode for the object in the 2D image data; and decoding the barcode to generate barcode payload data and determining the first object identification from the barcode payload data.

In some variations, the 3D image data includes a point cloud comprising a plurality of data points, each of the data points having a distance value associated with a distance from the 3D imaging apparatus, and determining the one or more geometric features of the object from the 3D image data is based on a first subset of the 3D image data and is not based on a second subset of the 3D image data, the first subset of the 3D image data being associated with a first subset of the data points having the respective distance value associated with the distance from the 3D imaging apparatus being within a predetermined range, the second subset of the 3D image data being associated with a second subset of the data points having the respective distance value associated with the distance from the 3D imaging apparatus being outside of the predetermined range.

In some variations, the memory further stores instructions that, when executed, cause the processor to, responsive to the determining (a) the proper scanning of the object, causing the processor to processing a transaction log to include the data associated with the object, and responsive to the determining (b) the improper scanning of the object, at least one of (i) generate an alert suitable for signaling a potential theft event, and (ii) process the transaction log to not include the data associated with the object.

In some variations, the memory further stores instructions that, when executed, cause the processor to: determine, from the 3D image data, a scanning direction of the object relative to the 2D imaging apparatus; and in response to the scanning direction being an improper scanning direction, preventing capturing of the 2D image by the 2D imaging apparatus, until a release condition is satisfied.

In some variations, the object is produce, and the memory further stores instructions that, when executed, cause the processor to: determine, as a first object identification of the object using the 2D image data, one or more colors of the object; determine, as a second object identification of the object using the 3D image data, a shape or dimension of the object; and compare the first object identification to the second object identification and determine a type of the produce.

In some variations, the object is produce, and the memory further stores instructions that, when executed, cause the processor to: determine, as a first object identification of the object using the 2D image data, one or more colors of the object; determine, as a second object identification of the object using the 3D image data, a shape or dimension of the object; and compare the first object identification to the second object identification and determine a listing potential types of the produce; and present the listing to a user of the scanning station for selection.

In some variations, the memory further stores instructions that, when executed, cause the processor to: determine, as a first object identification of the object using the 2D image data, a presence of a partially-decodable barcode and determine a listing of potential object matches from the partially-decodable barcode; determine, as a second object identification of the object using the 3D image data, a shape or dimension of the object; and compare the first object identification to the second object identification and determine if one or more of the listing of potential object matches corresponds to the shape or dimension indicated in the second object identification from the 3D image data.

In another embodiment, the present invention is a scanning station. The scanning station includes a two-dimensional (2D) imaging apparatus configured to capture a 2D image of an object in a field of view (FOV) of the 2D imaging apparatus and to identify a barcode in the 2D image for identifying the object from a barcode payload. The scanning station further includes a 3D imaging apparatus configured to capture a 3D image of the object in a FOV of the 3D imaging apparatus and generate 3D image data from the 3D image. The scanning station further includes a processor and memory storing instructions that, when executed, cause the processor to: capture the 3D image of the object and generate the 3D image data; identify one or more 3D object features of the object from the 3D image data; and perform one of (a) training an object recognition model with the 3D image data or (b) object recognition using the 3D image data.

In another embodiment, the prevent invention is a system. The system includes a two-dimensional (2D) imaging apparatus having a first field of view (FOV) and configured to capture a 2D image of a first environment appearing within the first FOV, the 2D image being stored as 2D image data corresponding to the 2D image. The system further includes a three-dimensional (3D) imaging apparatus having a second FOV that overlaps at least partially with the first FOV, the 3D imaging apparatus being configured to capture a 3D image of a second environment appearing within the second FOV, the 3D image being stored as 3D image data corresponding to the 3D image. The system further includes a processor and memory storing instructions that, when executed, cause the processor to: identify one or more 3D image features within the second environment from the 3D image data; enhance the 2D image data, resulting in enhanced 2D image data, by correlating the one or more 3D image features to at least one or more 2D image features in the 2D image data; and process the enhanced 2D image data to at least one of (a) decode a barcode captured within the enhanced 2D image data, (b) train an object recognition model with the enhanced 2D image data, (c) recognize an object within the enhanced 2D image data, and (d) identify an action performed by an operator of the barcode reader.

In a variation of this embodiment, the 3D image data comprises 3D point cloud data and the one or more 3D image features includes one or more geometric features of an object presented within the second FOV. In another variation of this embodiment, the 3D image data comprises 3D point cloud data and the one or more 3D image features includes a color or a color gradation corresponding an object presented within the second FOV. In another variation of this embodiment, the memory further stores instructions that, when executed, cause the processor to identify the one or more 3D image features by identifying the one or more 3D image features that are positioned within a predetermined distance range away from the 3D imaging apparatus. In some variations, the memory further stores instructions that, when executed, cause the processor to enhance the 2D image data by filtering the at least one or more 2D image features such that the processing the enhanced 2D image data excludes processing of image data associated with the at least one or more 2D image features. In some variations, the memory further stores instructions that, when executed, cause the processor to enhance the 2D image data by filtering the at least one or more 2D image features such that the processing the enhanced 2D image data is limited to processing of image data associated with the at least one or more 2D image features. In some variations, the system further includes a stationary barcode reader configured to be positioned within a workstation and operated by the operator, wherein the predetermined distance range away from the 3D imaging apparatus extends from the 3D imaging apparatus to an edge of the workstation proximate the operator. In some variations, the system further includes a bi-optic barcode reader having a product-scanning region, wherein the predetermined distance range away from the 3D imaging apparatus extends from the 3D imaging apparatus to a distal boundary of the product-scanning region.

In another variation of this embodiment, the one or more 3D image features includes at least one of (i) at least a portion of an operator's hand, and (ii) an object grasped by the operator's hand.

In another variation of this embodiment, the memory further stores instructions that, when executed, cause the processor to: process the enhanced 2D image data by identifying the action performed by the operator; and responsive to the action performed by the operator being identified as one of presenting an object within a product-scanning region and presenting the object proximate to the product-scanning region, and further responsive to no barcode being detected within at least one of the 2D image data and the enhanced 2D image data, generate an alert suitable for signaling a potential theft event.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
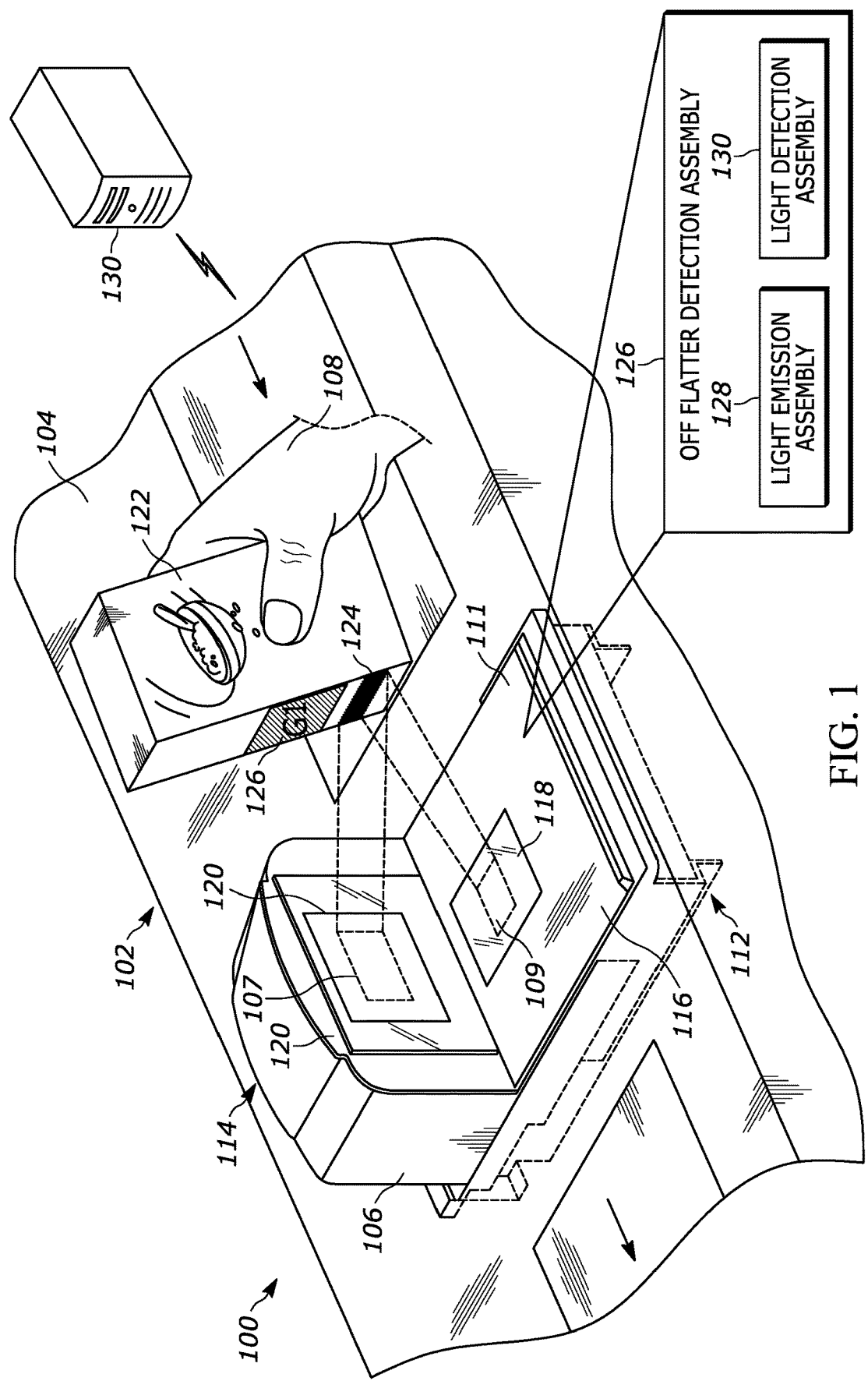
FIG. 1 is a perspective view of an example imaging system, implemented in an example point-of-sale (POS) system, having a bi-optical (also referred to as "bi-optic") symbology reader having a two-dimensional (2D) imaging apparatus and a three-dimensional (3D) imaging apparatus.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 illustrates a perspective view of an example imaging system capable of implementing operations of the example methods described herein, as may be represented by the flowcharts of the drawings that accompany this description. In the illustrated example, an imaging system 100 is in the form of a point-of-sale (POS) system, having a workstation 102 with a counter 104, a bi-optical (also referred to as "bi-optic") symbology reader 106 (that may be used in the theft detection and prevention, facial recognition, object recognition, and authentication systems and methods described herein), and a first camera 107 and a second camera 109, each at least partially positioned within a housing of the symbology reader 106, also referred to herein as a barcode reader. In examples herein, the symbology reader 106 is referred to as a barcode reader.

Figure 2:
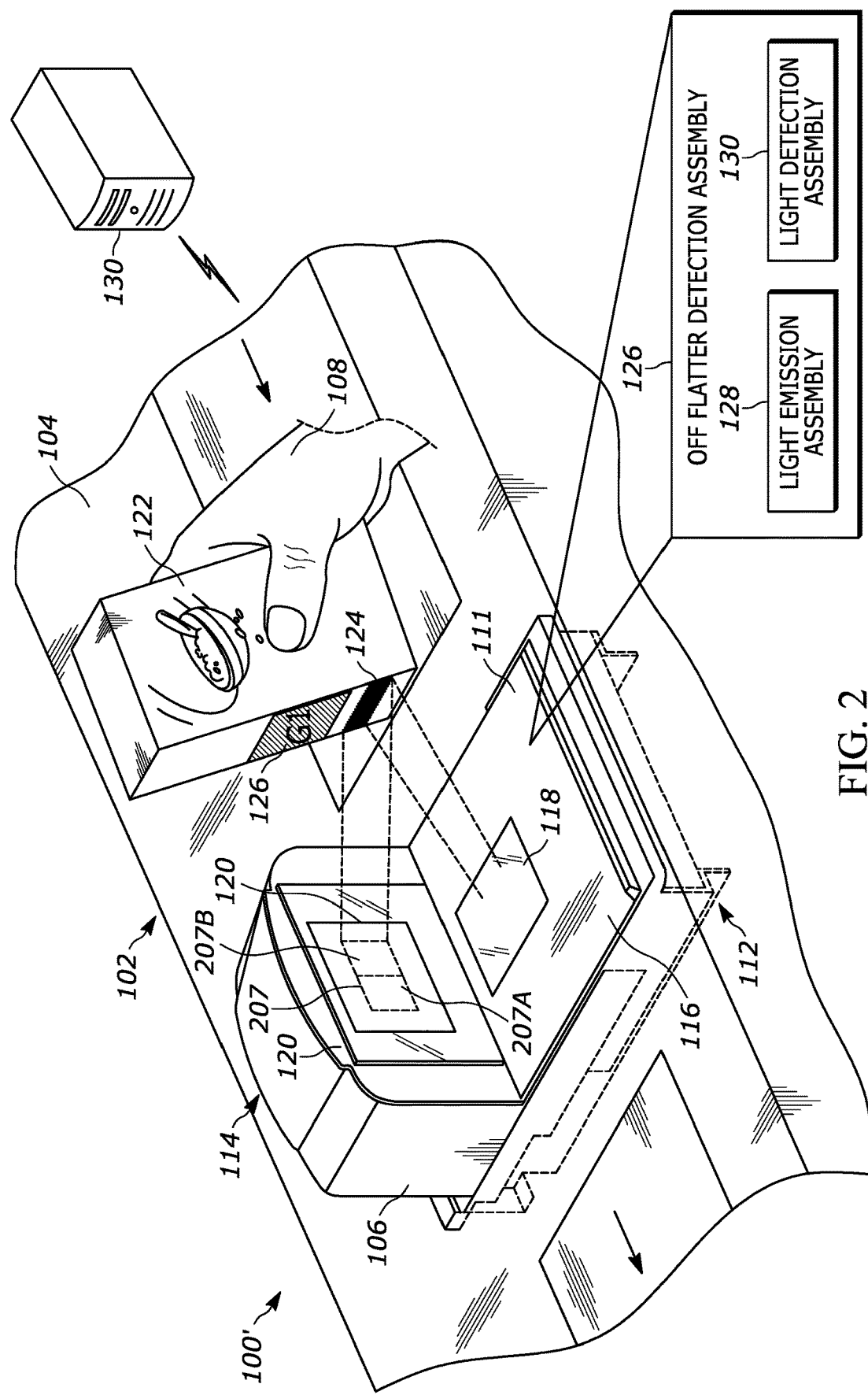
FIG. 2 is a perspective view of another example imaging system, implemented in an example POS system, having bi-optic symbology reader with a 2D imaging apparatus and 3D imaging apparatus.
Figure 3:
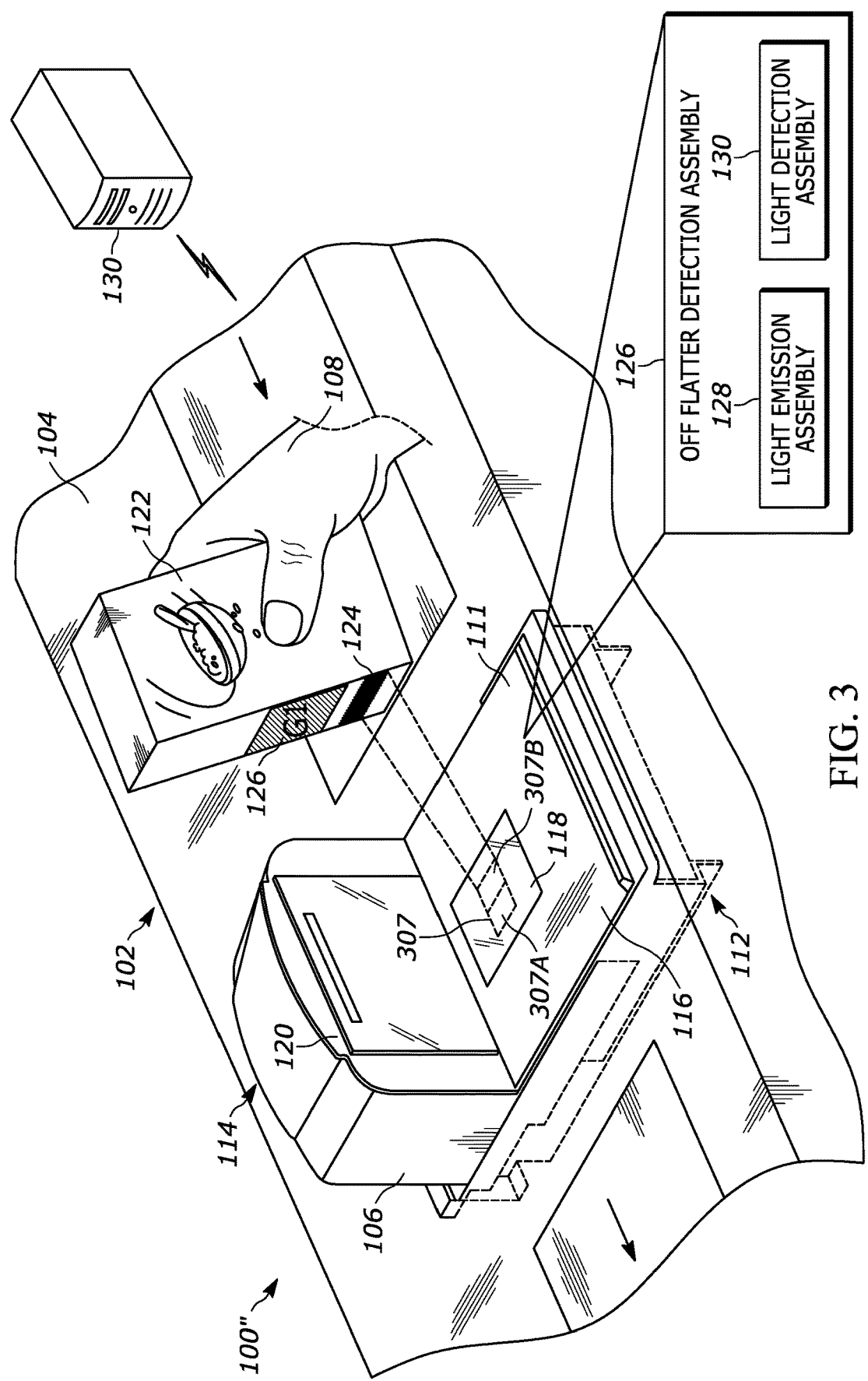
FIG. 3 is a perspective view of another example imaging system, implemented in an example POS system, having bi-optic symbology reader with a 2D imaging apparatus and 3D imaging apparatus.

In examples herein, the cameras 107 and 109 (as well as other cameras described in other examples including those of FIGS. 2-4) may be referred to as image acquisition assemblies and may be implemented as a color camera, monochromatic camera, or other camera configured to obtain images of an object. In the illustrated example, the camera 107 is within a vertically extending, upper housing 114 (also referred to as an upper portion or tower portion) of the barcode reader 106, and the camera 109 is within a horizontally extending, lower housing 112 (also referred to as a lower portion or platter portion). The upper housing 114 is characterized by a horizontally extending field of view for the camera 107. The lower housing 112 is characterized by a vertically extending field of view for the camera 109. In some examples, the upper housing 114 and lower housing 112 may each have two or more fields of view, for example, if the respective cameras are configured (e.g., through angle reflectors) to have different fields of view extending from different pixel regions of the camera sensor.

In some examples, the lower housing 112 includes a weigh platter 111, as part of a weigh platter assembly that will generally include the weigh platter 111 and an scale configured to measure the weight of an object placed on an example surface of the top portion 116, or some portion thereof. The surface of that top portion 116 extends in a first transverse plane and is generally or substantially parallel to an example top surface 124 of the workstation 102 that at least partially surrounds the weigh platter 111.

The weigh platter 111 may be part of an off-platter detection assembly 126 that includes an example light emission assembly 128 and an example light detection assembly 130. In an example, a light source (not shown for clarity of illustration) of the light emission assembly 128 is controlled to emit one or more pulses of light, and a light sensor (not shown for clarity of illustration) of the light detection assembly 130 captures light and the off-platter detection assembly 126 can process light detection information to detect when a portion of an item, object, etc. is not resting on or is extending over an edge of the weigh platter 111 as an off-platter weigh condition. For simplicity, only a single light emission assembly 128 and only a single light detection assembly 130 are described herein, however, it will be understood that off-platter detection assembly 126 can also include any number and/or type(s) of light emission assemblies, and any number and/or type(s) light detection assemblies may be implemented to detect off-platter weigh condition. Other example symbology readers with off-platter detection discussed in reference to FIGS. 5-7.

In the illustrated example of FIG. 1, one of the cameras 107, 109 is a 2D camera and the other of the cameras is a 3D camera. That is, in various embodiments, the upper housing 114 may include a 2D camera or a 3D camera, while the lower housing 112 may include a 3D camera or a 2D camera.

While the cameras 107 and 109 are shown in an example configuration each in a different housing portion, the imaging systems herein may include any number of imagers housed in any number of different devices. FIG. 2, for example, illustrates an imaging system 100' having similar features (and like reference numerals) to imaging system 100 of FIG. 1, but in which a camera assembly 207 includes both a 2D camera 207A and a 3D camera 207B, each within an upper housing 114, without a separate camera in the lower housing 112. FIG. 3 illustrates another imaging system 100" having similar features (and like reference numerals) to imaging system 100 of FIG. 1, but with a camera assembly 307 that includes a 2D camera 307A and a 3D camera 307B, each with a lower housing 114, without a separate camera in the upper housing 114.

Further, while FIGS. 1-3 illustrate example bi-optic barcode readers 106 as the imager (each figure showing a different camera configuration), in other examples, the imager may be a handheld device, such as a handheld barcode reader, or a fixed imager, such as barcode reader held in place in a base and operated within what is termed a "presentation mode." An example in shown in FIG. 6, discussed further below.

Returning to FIG. 1, the lower housing 112 may be referred to as a platter or first housing portion and the upper housing 114 may be referred to as a tower, raised, or a second housing portion. The lower housing 112 includes a top portion 116 with a first optically transmissive window 118 positioned therein along a generally horizontal plane relative to the overall configuration and placement of the barcode reader 106. The window 118 coincides with a field of view(s) of the camera 109 in the example of FIG. 1 and coincides with a field of view(s) of the camera assembly 307 in the example of FIG. 3. In some examples, the top portion 116 includes a removable or a non-removable platter (e.g., a weighing platter). The upper housing 114 includes a second optically transmissive window 120 positioned there along a generally vertical plane and coinciding with a field of view(s) of the camera 107.

In the illustrated example of FIG. 1, as well as FIGS. 2-4, the barcode reader 106 captures images of an object, in particular a product 122, such as for example a box, scanned by a user 108, e.g., a customer or sales clerk. In some implementations, the barcode reader 106 captures these images of the product 122 through one of the first and second optically transmissive windows 118, 120. For example, image capture may be done by positioning the product 122 within the fields of view FOV of the digital imaging sensor(s) housed inside the barcode reader 106. The barcode reader 106 captures images through these windows 118, 120 such that a barcode 124 associated with the product 122 is digitally read through at least one of the first and second optically transmissive windows 118, 120. Further in some examples, a graphic 126 on the product may also be digitally analyzed through images captured through these windows 118, 120.

In example configurations of FIG. 1, 2D images of the product 122 are captured by the camera 107 over a field of view (FOV) of the camera 107, each 2D image being of environment appearing within that FOV. That is, in an example, the camera 107 is a 2D camera that captures 2D images and generates 2D image data that can be processed, for example, to verify that the product 122 scanned matches the barcode 124 and/or image data can be used to populate a database.

In example configurations of FIG. 1, 3D images of the product 122 are captured by the camera 109 over FOV of the camera 109, each 2D image being of environment appearing within that FOV. That is, in an example, the camera 109 is a 3D camera that captures 3D images and generates 3D image data that can be processed, for example, to verify that the product 122 scanned matches the barcode 124 and/or image data can be used to populate a database. In other examples, camera 107 may be a 3D camera and camera 109 may be a 2D camera. While in FIG. 2, the camera 207 includes a 2D camera 207A and a 3D camera 207B within the upper housing 114, and in FIG. 3, the camera 307 includes a 2D camera 307A and a 3D camera 307B within a lower housing 112.

To implement operations of the example object detection techniques herein, including those of FIGS. 8-16, images captured by 2D cameras and by the 3D cameras in the examples herein may be used for identifying an object (such as the product 122), such as through determining a first object identification data using images captured of the object and determining a second object identification data using a symbology on the object (such as, the barcode 124), and comparing the two identification data. In some examples, the images captured by the 2D camera(s) and 3D camera(s) are used to identify 2D image features and/or 3D image features, respectively, for controlling parameters associated with operation of a symbology reader. In some examples, the images captured by the 2D camera(s) and 3D camera(s) are used to identify facial data for controlling parameters associated with operation of a symbology reader or for authenticating operation of a symbology reader. By capturing and processing 2D image data and 3D image data, symbology readers in various examples are able to process enhanced 2D or 3D image data to train an object recognition model with the enhanced 3D image data, to recognize an object within enhanced image data, to identify an action performed by a user of the barcode reader, and/or to change at least one parameter associated with the symbology reader, whether that parameter is associated with the 3D imaging apparatus, the 2D imaging apparatus, or other system associated with the symbology reader.

In the illustrated example of FIG. 1, the imaging system 100 includes a remote server 130 communicatively coupled to the barcode reader 106 through a wired or wireless communication link. In some examples, the remote server 130 is communicatively coupled to a plurality of imaging systems 100 positioned at checkout area of a facility, for example. In some examples, the remote server 130 is implemented as an inventory management server that generates and compares object identification data. In some examples, the remote server 130 is accessible by a manager for monitoring operation and improper product scanning by the imaging system 100.

Figure 4A:
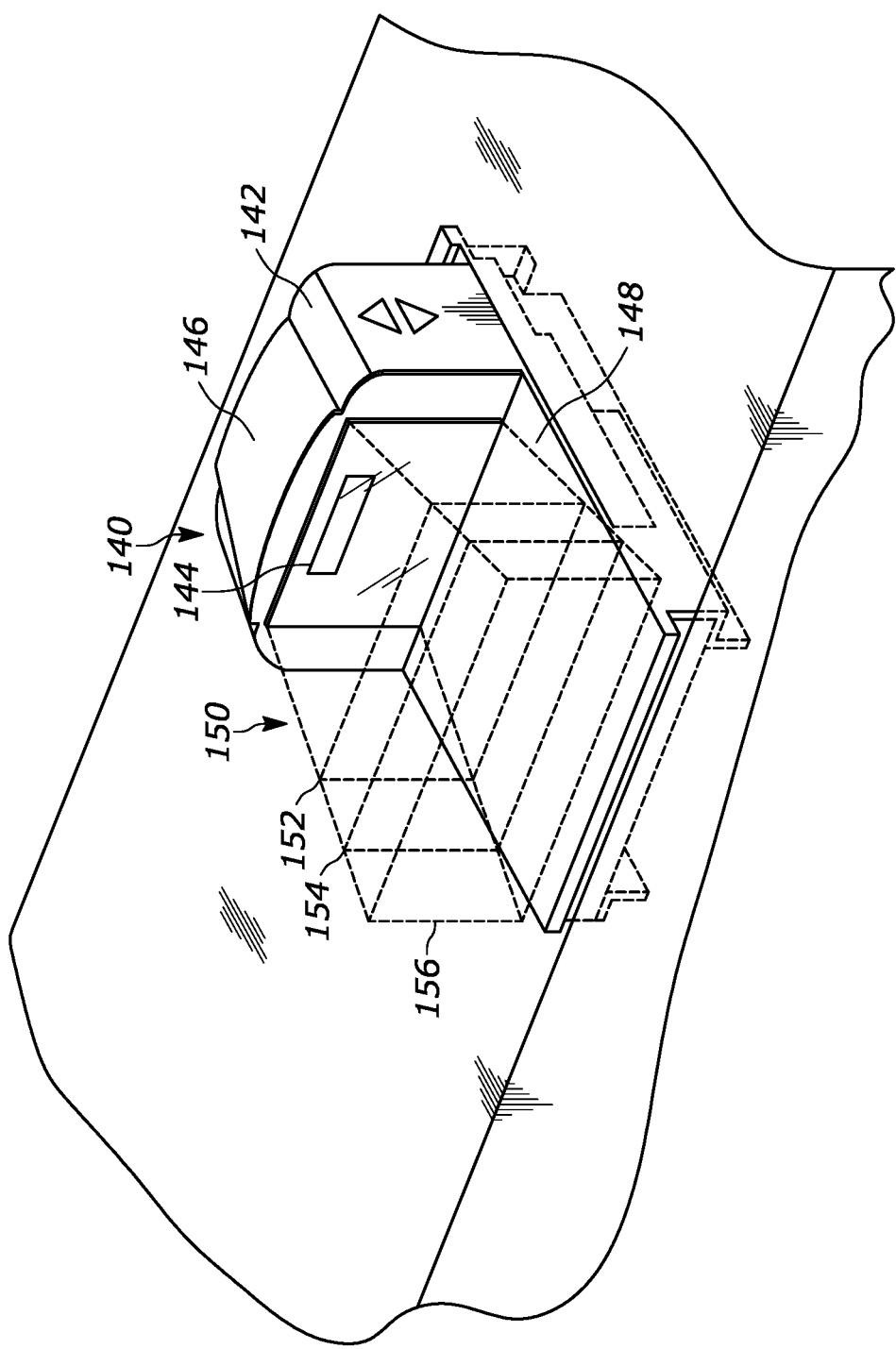
FIGS. 4A and 4B are a perspective view and a cross-sectional view, respectively, of another example imaging system, implemented in an example POS system, having bi-optic symbology reader showing an internal 3D imaging apparatus and showing a field of view of that 3D imaging apparatus.

FIG. 4A illustrates another perspective view an example imaging system 140 having a symbology reader 142, with a 3D imaging apparatus 144, in this example within an tower portion 146 of the symbology reader 142. A platter portion 148 is similarly shown. A horizontally extending FOV 150 for the 3D imaging apparatus 144 is shown. The 3D imaging apparatus 144, as with the other 3D imaging apparatuses in other examples herein, is able to capture 3D images of an environment within the FOV 150 and further determine the position of one or more objects in that field of view. Example planes 152, 154, and 156 are shown each representing a different distance from the 3D imaging apparatus 144. Thus, objects and object distances may be identified in 3D images and stored in 3D image data generated by the 3D imaging apparatus 144. In particular, as discussed further herein, the object type (e.g., a product to be scanned, an operator hand, or a human face) may be identified from 3D image data and the location of that object may be determined from to control operation of the symbology reader 142. For example, in some examples, the symbology reader 142 may be controlled to capture a 2D image for barcode reading only when an object of a certain type has been identified or when an object of a certain type is identified as being within a distance of the symbology reader 142, such as between the 3D imaging apparatus 144 and the distance set forth by plane 154. Objects further away than plane 154 (such as objects at plane 156) may be ignored and not scanned, for example. Similarly, objects closer than plane 152 may be ignored or may be scanned using a different illumination assembly or by adjusting a focusing plane of a 2D imaging apparatus. In some examples, the distance of objects appearing within an environment may be used to segment out certain objects from the 3D image data to increase scanning accuracy or to generate training images for an object recognition model. Other examples are described.

Figure 4B:
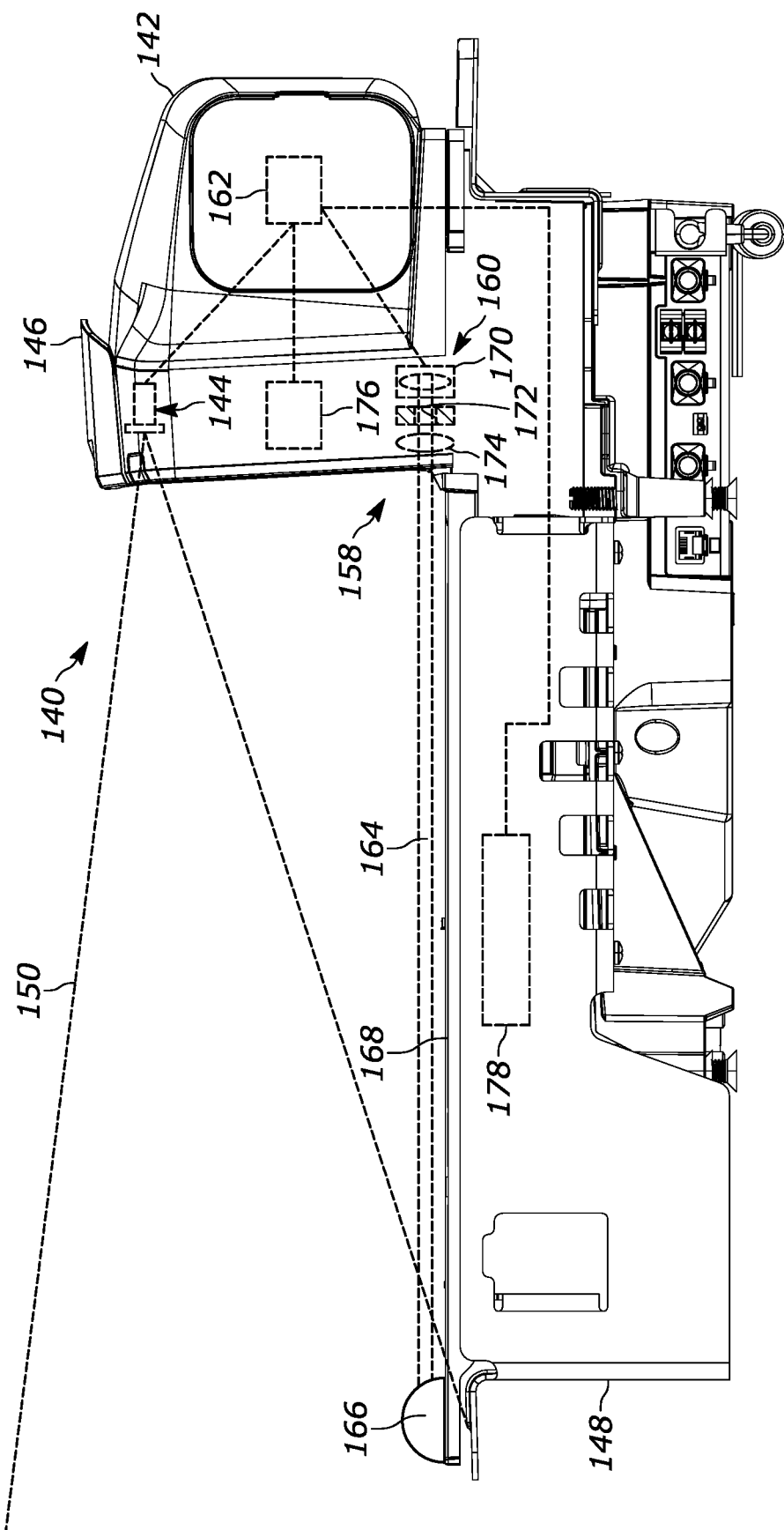

FIG. 4B is a cross-sectional view of the imaging system 140 showing the symbology reader 142 having an off-platter detection assembly 158, which may represent two off-platter detection assemblies one on each outer longitudinal edge of the imaging system 140. To provide off-platter detection, a light emission assembly 160 can be provided coupled to a controller 162 of the symbology reader 140, where the controller 162 can be configured to operate the off-platter detection assembly 158 in various modes. For example, in a first mode of operation, controller 162 can send an instruction to light emission assembly 160 to emit collimated light beam 164 continuously, which would provide an indication of an off-platter event any time one of a light diffusing barrier 166 is not illuminated. In a second mode of operation, the controller 162 can also be operatively coupled to weigh platter 168 and send an instruction to the light emission assembly 160 not to emit collimated light beam 164 until controller 162 detects an object on the weigh platter 168 and the measured weight of the object has settled. Once the measured weight has settled (after a positive dwell period), the controller 162 can send an instruction to light emission assembly 160 to emit collimated light beam 164 to allow a user to determine if there is an off-platter event and to stop emitting collimated light beam 164 once the controller 162 has detected removal of the object from the weigh platter 168. This mode of operation conserves energy and prevents light diffusing barrier 166 from continuously illuminating and de-illuminating every time a non-weighing object is passed over the weigh platter 168 to be scanned by the symbology reader 140. In a third mode of operation, the controller 162 is again operatively coupled to the weigh platter 168. However, in this mode of operation the controller 162 can send an instruction to light emission assembly 160 to blink collimated light beam 164 once the controller 162 detects an object placed on the weigh platter 168 to provide an alert to and draw the attention of the user that light diffusing barrier 166 should be checked. The controller 162 can also generate a notification sound or alert to reminder the user to check light diffusing barrier 166. Once the measured weight of the object has settled (after a positive dwell period) the controller 162 then sends an instruction to the light emission assembly 160 to stop blinking collimated light beam 164 and to emit collimated light beam 164 continuously.

In some examples, the collimated light beam 164 is emitted by a light source 170. The light emission assembly 160 may also include an aperture 172, which could be formed in a wall or protrusion of a housing or could be formed through another wall or structure that is part of weigh platter 168, positioned in front of the light source 170 to focus collimated light beam 164 into a narrow beam along a lateral edge of the weigh platter 168. A lens 174 can also be positioned in front of aperture 172 to increase the intensity of the collimated light beam 164.

As shown, the 3D imaging apparatus 144 has the FOV 150 that extends along weigh platter 168 and encompasses light diffusing barrier 166 and is in communication with the controller 162. In this example, the controller 162 is configured to receive 3D images from the 3D camera 144 and 2D images from a 2D camera 176 in the tower portion 146 and/or a 2D camera 178 in the platter portion 148. In some implementations, only one of the 2D cameras may be provided. The controller 162 may be configured to receive images from the cameras 144 and 176/178 and, based on the images received, perform various operations described herein, such as, for example, adjusting one or more operating parameters of the symbology reader 140. The controller 162 may additional determine if light diffusing barrier 166 appears to be illuminated or appears not to be illuminated, from 3D images captured by the camera 144 or from 2D images captured by the camera 176. If the controller 162 determines that light diffusing barrier 166 appears to be illuminated, the controller 162 will allow the measured weight of an object on the weigh platter 168 to be recorded by a host system operatively coupled to the controller 162. If the controller 162 determines that light diffusing barrier 166 appears not to be illuminated, the controller 162 will prevent the measured weight of the object from being recorded by the host system and/or can provide an alert to the user that there is on off-platter event.

Figure 5:
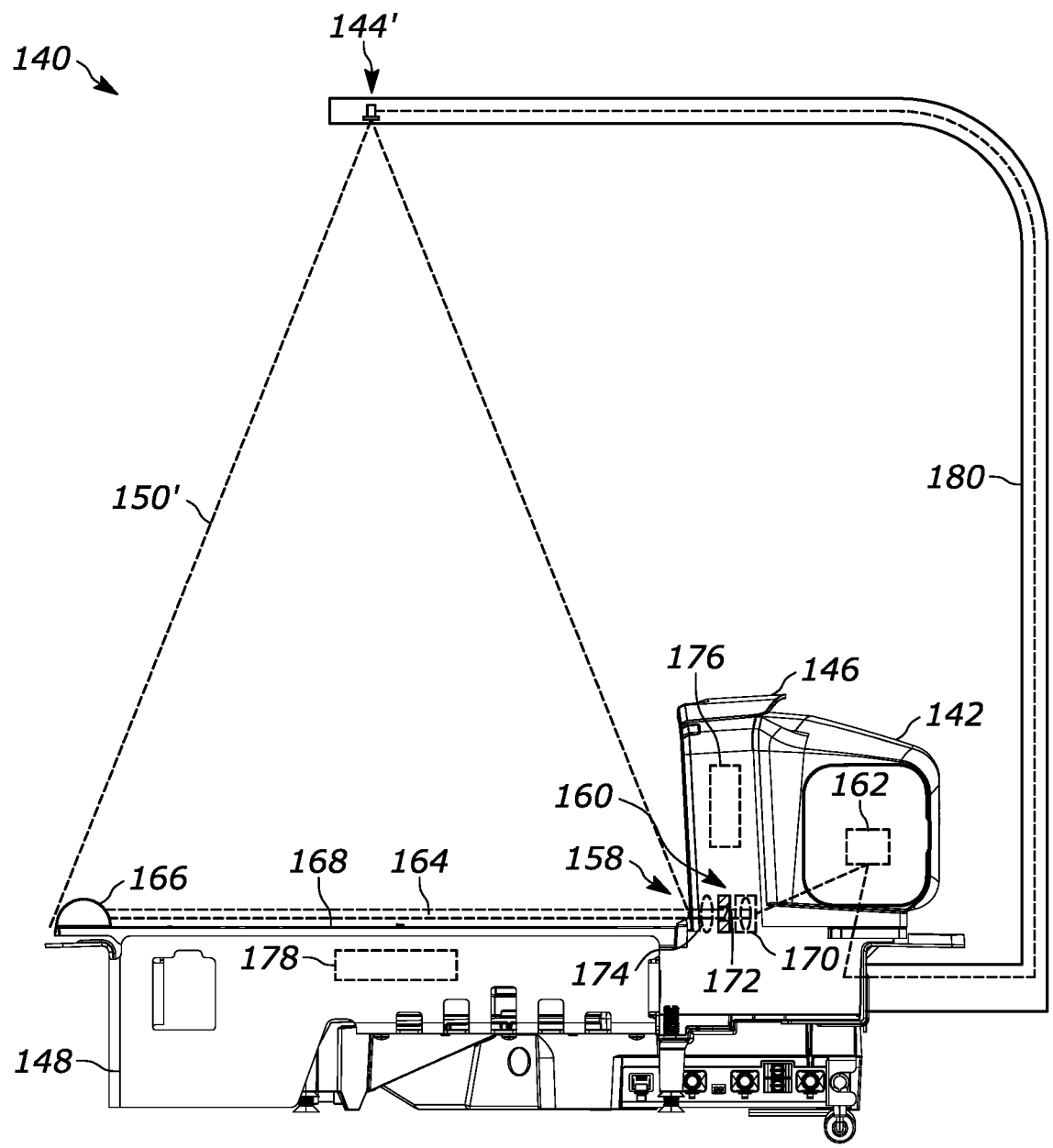
FIG. 5 is a perspective view of another example imaging system, implemented in an example POS system, having bi-optic symbology reader having an associated 2D imaging apparatus within a reader housing and an associated 3D imaging apparatus external to the reader housing.

FIG. 5 illustrates an alternative implementation of the imaging system 140 of FIGS. 4A and 4B, labeled 140' and using like reference numerals to like elements. In contrast to the imaging system 140 in which the 3D imaging apparatus 144 was internal to the symbology reader 142, in the imaging system 140' 3D imaging apparatus 144' is still associated with the symbology reader 142 but is external to thereto and positioned overhead with a vertical, downward extending FOV 150'. In the example shown, the 3D imaging assembly 144' is within an overhead camera system shown located in a gooseneck post 180 that extends from the back of symbology reader housing. However, the overhead camera system with the 3D imaging assembly 144' could be located anywhere above the housing of the symbology reader 142. For example, the overhead camera system could be located in a ceiling above symbology reader 142 and looking down on the symbology reader 142, such as security cameras that are used with some point-of-sale systems. In some examples, a single overhead camera system with one or more 3D imaging apparatuses may look down on one or more imaging systems.

Figure 6:
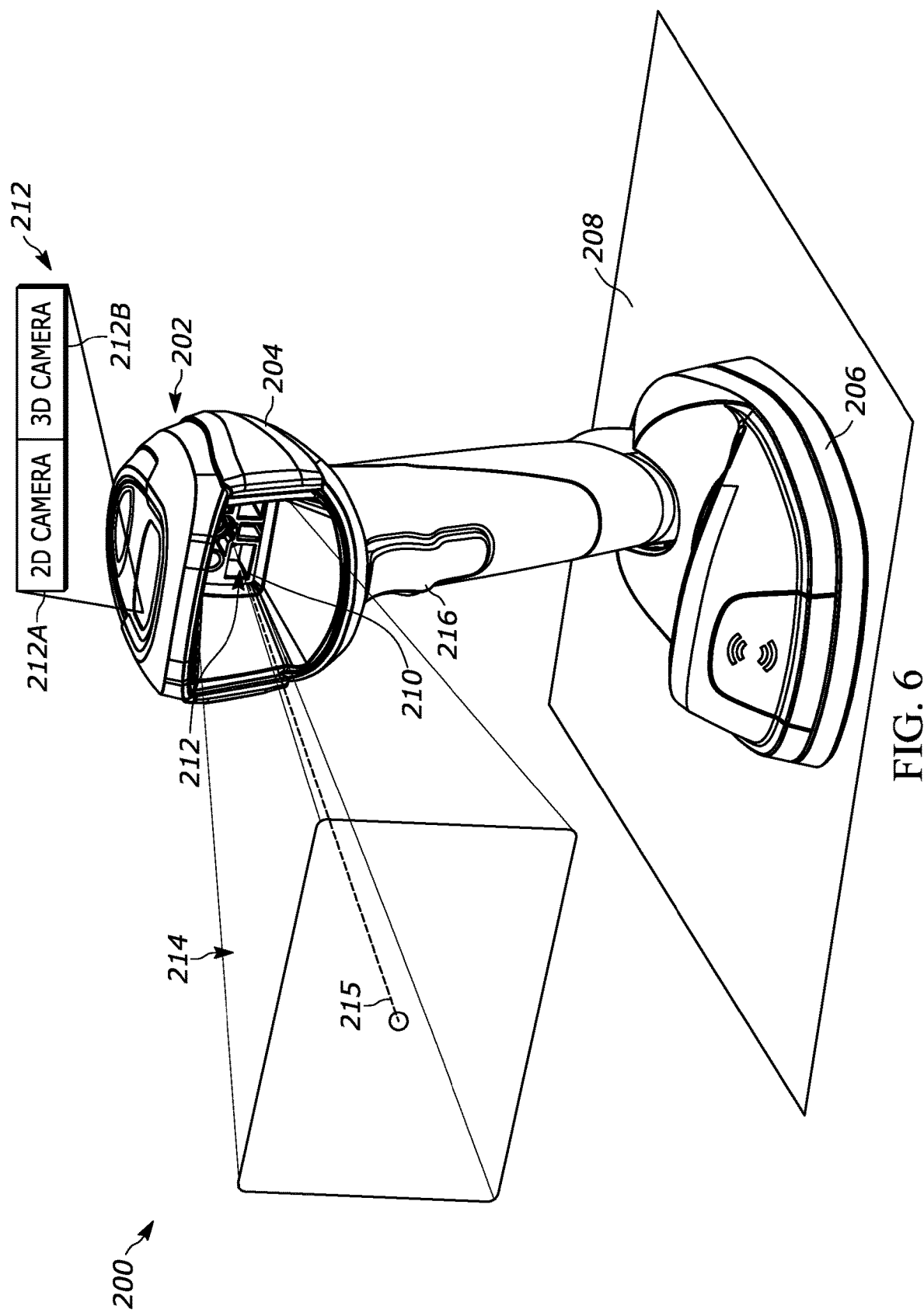
FIG. 6 is a perspective view of another example imaging having a handheld symbology reader having a 2D imaging apparatus and 3D imaging apparatus.

FIG. 6 illustrates another example imaging system capable of implementing operations of the example methods described herein, as may be represented by the flowcharts of the drawings that accompany this description. In the illustrated example, an imaging system 200 includes a symbology reader in the form of a handheld or presentation barcode reader 202 that may be used in the object imaging and other methods described herein. In the illustrated example, the barcode reader 202 may include a handheld reader 204 and a stationary cradle 206 mounted to a workstation surface 208. In the illustrated example, the handheld reader 204 rests in the stationary cradle to establish a hands-free scanning mode, also termed a presentation mode, for scanning objects. The handheld reader 204 therefore operates as an imaging reader, with a scanning window 210 in the housing of the handheld reader 204, behind which is a camera assembly 212 and optionally an illumination assembly 211 (which may represent one or more different illumination sources, such as a direct illumination source and a diffuse illumination source for capturing 2D and/or 3D images). In the hands-free scanning mode, the handheld reader 204 defines a FOV 214 having a central axis 215. In accordance with the techniques herein, the handheld reader 204 captures images of an object for identification and imaging within the FOV 214. A trigger 216 may be used to initiate a hands-free scanning mode, in some examples. In some examples, the hands-free scanning made is initiated by placement of the reader 204 into the cradle 206.

In the illustrated example, the camera assembly 212 includes a 2D camera 212A for capturing 2D images of an object in the FOV 314 and generating 2D image data. The camera assembly 212 further includes a 3D camera 2126 for capturing 3D images of an object in the FOV 314 and generating 3D image data. While the FOV 314 may be for each of the cameras 212A and 212B, in other examples, each of the cameras 212A and 2126 may have a different FOV, either partially overlapping or non-overlapping. In some examples, the FOV 314 may include a first portion corresponding to the 2D camera 212A and a second portion corresponding to 3D camera 212B.

Figure 7:
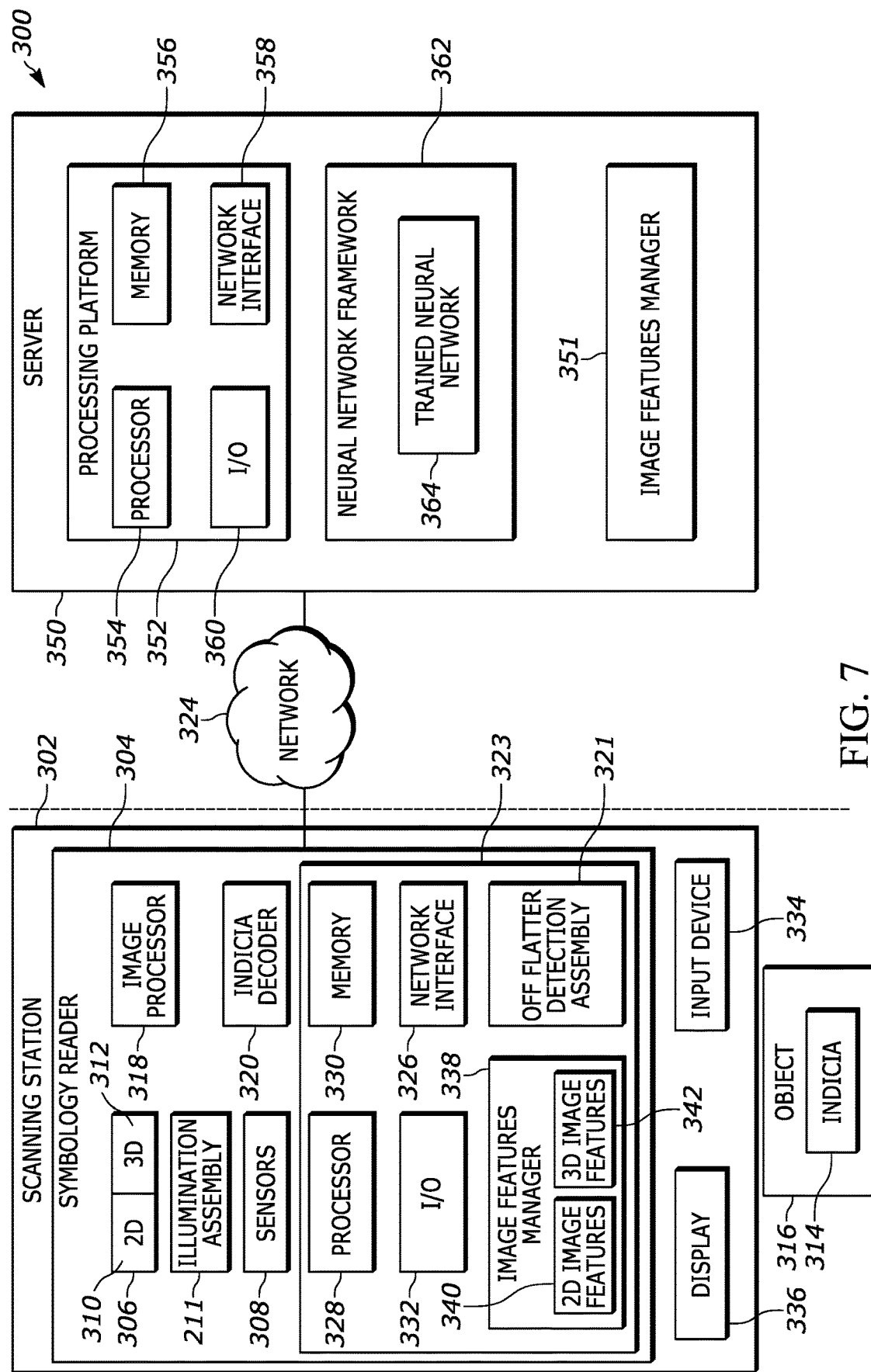
FIG. 7 illustrates a block diagram of an example logic circuit of a scanning station and remote server for implementing example methods and/or operations described herein including those of the imaging systems of FIGS. 1-6.

FIG. 7 illustrates an example system where embodiments of the present invention may be implemented. In the present example, the environment is provided in the form of a facility having one or more scanning locations 300 corresponding to an imaging system, such as the imaging systems 100, 100', 100", 140, 140" and 200 of 1, 2, 3, 4A, 4B, 5, and 6, respectively, where various objects may be scanned for completing a purchase of an object, for improper object detection to override an improper purchase attempt, and other purposes herein.

In an example, the scanning location 300 is a point-of-sale location and includes a scanning station 302 having a symbology reader 304, such as a bi-optic barcode reader like barcode reader 106 in FIGS. 1-5 and the handheld barcode reader 202 in FIG. 6. The symbology reader 304 may include a scanner, such as a barcode scanner, and any additional type of symbology reader, such as an RFID tag reader. In the example of FIG. 1, the symbology reader 304 is also described as a reader 304, for convenience sake, although any type of symbology reader is meant to be included.

In another example, the scanning location is a machine vision location and the scanning station 302 is a machine vision system having a 2D imaging apparatus and a 3D imaging apparatus and configured to perform processes such as those described in reference to FIG. 11 and elsewhere herein.

The reader 304 includes an imaging device 306 (e.g., an imaging assembly in the form of a camera assembly 306 or other photodetection device) and one or more sensors 308. The camera assembly 306 includes a 2D camera 310 and a 3D camera 312 for capturing respective images and generating respective image data, in accordance with the techniques described herein. As discussed in various examples herein, the 2D camera 310 and 3D camera 312 are associated with the symbology reader 304 and may be within a housing thereof or external to a housing but coupled to the symbology reader 304 through a wired or wireless communication link. In some examples, the reader 304 may be a barcode image scanner capable of scanning a 1D barcode, QR code, 3D barcode, or other symbology as the indicia 314, as well as capturing images of an object 316 itself. In the illustrated example, the scanning station 304 includes sensors 308, which may include an RFID transponder for capturing indicia data is the form of an electromagnetic signal captured from the indicia 314 when the indicia 314 is an RFID tag, instead of an visual indicia, such as a barcode.

The reader 304 further includes an image processor 318 and an indicia decoder 320. In some examples, the image processor 318 is a 2D image data processor and a 3D image data processor, capable of processing color image data, point cloud image data, and then the like of an object.

The image processor 318 may be configured to analyze captured images of the object 316 and perform preliminary image processing, e.g., before 2D and 3D images and image data is sent to a remote server 350 via a network 324. The reader 304 includes a network interface 326 that represents any suitable type of communication interface(s) (e.g., wired and/or wireless interfaces) configured to operate in accordance with any suitable protocol(s) for communicating over the network 324.

In the example of a bi-optic barcode reader, the symbology reader 304 includes an off-platter detection assembly 321 that may include a light emission assembly and light detection assembly, different than the camera assembly 306.

In the illustrated example, the reader 304 includes a processing platform 323 having a processor 328 such as, for example, one or more microprocessors, controllers, and/or any suitable type of processor. The processing platform 323 further includes a memory 330 (e.g., volatile memory, non-volatile memory) accessible by the processor 328 (e.g., via a memory controller). The example processor 328 interacts with the memory 330 to obtain, for example, machine-readable instructions stored in the memory 330 corresponding to, for example, the operations represented by the flowcharts of this disclosure, including those of FIGS. 8, 10, 12, 13, 15, and 16. Additionally or alternatively, machine-readable instructions corresponding to the example operations described herein may be stored on one or more removable media (e.g., a compact disc, a digital versatile disc, removable flash memory, etc.) that may be coupled to the reader 304 to provide access to the machine-readable instructions stored thereon.

The process 328 may be a programmable processor, a programmable controller, a graphics processing unit (GPU), a digital signal processor (DSP), etc. Alternatively, an application specific integrated circuit (ASIC), a programmable logic device (PLD), a field programmable gate array (FPGA), a field programmable logic device (FPLD), a logic circuit, etc. may be structured or configured to implement the processor 328. Example memory 330 include any number or type(s) of non-transitory computer-readable storage medium or disk, such as a hard disk drive (HDD), an optical storage drive, a solid-state storage device, a solid-state drive (SSD), a read-only memory (ROM), a random-access memory (RAM), a compact disc (CD), a compact disc read-only memory (CD-ROM), a digital versatile disk (DVD), a Blu-ray disk, a cache, a flash memory, or any other storage device or storage disk in which information may be stored for any duration (e.g., permanently, for an extended time period, for a brief instance, for temporarily buffering, for caching of the information, etc.).

The reader 304 of FIG. 7 also includes input/output (I/O) interfaces 332 to enable receipt of user input and communication of output data to the user, an input device 334 for receiving input from the user, and a display 336 device for displaying data, alarms, and other indications to a user. In the illustrated example, the I/O interfaces 332 are part of the processing platform 323 along with the network interface 326. Although FIG. 7 depicts the I/O interfaces 332 as a single block, the I/O interfaces 332 may include a number of different types of I/O circuits or components that enable the processor 328 to communicate with peripheral I/O devices. Example interfaces 332 include an Ethernet interface, a universal serial bus (USB), a Bluetooth® interface, a near field communication (NFC) interface, and/or a PCI Express interface. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.), a navigation device (a mouse, a trackball, a capacitive touch pad, a joystick, etc.), a speaker, a microphone, a printer, a button, a communication interface, an antenna, etc.

To perform indicia identification, in some examples, the image processor 318 is configured to identify the indicia 314 captured in a 2D image, e.g., by performing edge detection and/or pattern recognition, and the indicia decoder 320 decodes the indicia and generates object identification data corresponding to the indicia 314.

In some examples, the image processor 318 is further configured to capture images of the object 316 and determine other object identification data based on features in the 2D image data, the 3D image data, or a combination thereof.

For example, in some examples, the image processor 318 identifies image features of the object 316 captured by in 2D image data. Example image features include the peripheral shape of the object, the approximate size of the object, a size of the packaging portion of the object, a size of a product within a packaging (e.g., in the case of a packaged meat or produce), a relative size difference between a size of the product and a size of the packaging, a color of the object, packaging, and/or good, images on the object, text on the object, point-of-sale lane and store ID from where the item was scanned, shape of product, weight of product, variety of the product especially for fruits, and freshness of the product.

The image features identified by the image processor 318 can be categorized into image features derived from 2D image data captured by the 2D camera 310 and image features derived from 3D image data captured by the 3D camera 312. The image processor 318 may send these image features within the image scan data to the remote server 350.

In some examples, the image processor 318 is configured to identify one or more 3D image features in the captured 3D image data and identifying one or more 2D image features in the captured 2D image data. The 3D image data may be point cloud data and the 3D image features may include color data for objects, color gradient data for objects, shape data for objects, dimension data for objects, distance data for objects relative to other objects or relative to the symbology reader or relative to the 3D camera, or other 3D features. The 2D image features may be shape data for objects, dimension data for objects, graphics on objects, labels on objects, text on objects, or other 2D features.

While in some examples, the 2D and 3D image features are identified in the image processor 318, in other examples, 2D image feature determination and 3D image feature determination are performed in an image features manage 338 having stored 2D images features 340 and stored 3D image features 342.

Whether the 2D image features and/or 3D image features are determined in the image processor 318 or in the image features manager 338, in various examples, the reader 304 is configured to enhance decoding of the indicia 314 captured in 2D image data using captured 3D image data. In various examples, the reader 304 is configured to enhance 2D image data and/or 2D image data analysis with 3D image data. In various examples, the reader 304 is configured to enhance 3D image data and/or 3D image data analysis with 2D image data. In various examples, the reader 304 is configured to enhance theft detection and prevention, facial recognition, object recognition, and/or authentication processes using both the 2D image data and the 3D image data. In various examples, the reader 304 is configured to perform these processes (i.e., theft detection and prevention, facial recognition, object recognition, and/or authentication) using only 3D image data captured by the reader 304. To perform these and other processes in accordance with the techniques herein, the image features manager 338 may be configured to perform processes as detailed in FIGS. 8-16, described further hereinbelow. Furthermore, in some examples, one or more of these processes may be performed at the remote server 350, which may include an image features manager 351 configured to perform one or more of the processes described herein, such as those detailed in FIGS. 8-16.

In an example, the remote server 350 is an image processing and object identification server configured to receive 2D images (2D image data) and 3D images (3D image data) (and optionally other image scan data, such as decoded indicia data, physical features, etc.) from the scanning station 302 and perform object identification such as object identification and improper object detection and other techniques described herein, including at least some of the processes described in reference to FIGS. 8-16.

The remote server 350 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used.

The remote server 350 includes an example logic circuit in the form processing platform 352 capable of, for example, implementing operations of the example methods described herein include. The processing platform 352 includes a processor 354 such as, for example, one or more microprocessors, controllers, and/or any suitable type of processor. The example processing platform 352 includes memory (e.g., volatile memory, non-volatile memory) 356 accessible by the processor 354 (e.g., via a memory controller). The example processor 354 interacts with the memory 356 to obtain, for example, machine-readable instructions stored in the memory 356 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 352 to provide access to the machine-readable instructions stored thereon.

The example processing platform 352 also includes a network interface 358 to enable communication with other machines via, for example, one or more networks, including the scanning station 302. The example network interface 358 includes any suitable type of communication interface(s) (e.g., wired and/or wireless interfaces) configured to operate in accordance with any suitable protocol(s), as well the network interface 326. The example, processing platform 352 also includes input/output (I/O) interfaces 360 to enable receipt of user input and communication of output data to the user, in a similar manner to that of I/O interface 332.

In some examples, the remote server 350 may be, or may contain, a classification server. As such, in the illustrated example, the remote server 350 includes, in a neural network framework 362 configured to develop a trained neural network 364 and to use that trained neural network to receive 2D and 3D images captured by the symbology reader 304, identify objects within the received images, and classify those objects. The neural network framework 362, for example, may be configured as a convolutional neural network employing a multiple layer classifier to assess identified image features and generate classifiers for the trained neural network 364.

The trained neural network 364 may be trained to classify objects in received 2D and/or 3D image data by object type, scanning surface of the object, whether the object is a display screen such as a mobile device display, reflectivity of the object, and/or type of indicia on object. By way of example, the trained neural network 364 may be trained using 2D images, 2D image data enhanced with 3D image data, 3D image data, and/or 3D image data enhanced with 2D image data.

In these ways, through the framework 362 and the trained neural network 364, in various examples, the present techniques deploy one or more trained prediction models to assess received 2D and/or 3D images of an object (with or without indicia) and classify those images to determine an object and object classification, for identifying contextual configuration settings to use in operating the scanning station 302 or other imaging devices.

From the determined classifications, in various examples, the present techniques use an object's classification to determine adjustments for configuration settings of the imaging scanner. That is, a prediction model is trained using the neural network framework k362, and as such that prediction model is referred to herein as a "neural network" or "trained neural network." The neural network herein may be configured in a variety of ways. In some examples, the neural network may be a deep neural network and/or a convolutional neural network (CNN). In some examples, the neural network may be a distributed and scalable neural network. The neural network may be customized in a variety of manners, including providing a specific top layer such as but not limited to a logistics regression top layer. A convolutional neural network can be considered as a neural network that contains sets of nodes with tied parameters. A deep convolutional neural network can be considered as having a stacked structure with a plurality of layers. In examples herein, the neural network is described as having multiple layers, i.e., multiple stacked layers, however any suitable configuration of neural network may be used.

CNNs, for example, are a machine learning type of predictive model that are particularly using for image recognition and classification. In the exemplary embodiments herein, for example, CNNs can operate on 2D or 3D images, where, for example, such images are represented as a matrix of pixel values within the image scan data. As described, the neural network (e.g., the CNNs) can be used to determine one or more classifications for a given image by passing the image through the series of computational operational layers. By training and utilizing theses various layers, the CNN model can determine a probability that an image (or object(s) within an image) or physical image features belongs to a particular class. Trained CNN models can be persisted for restoration and use, and refined by further training. Trained models can reside on any in-premise computer volatile or non-volatile storage mediums such as RAM, flash storage, hard disk or similar storage hosted on cloud servers.

Figure 8:
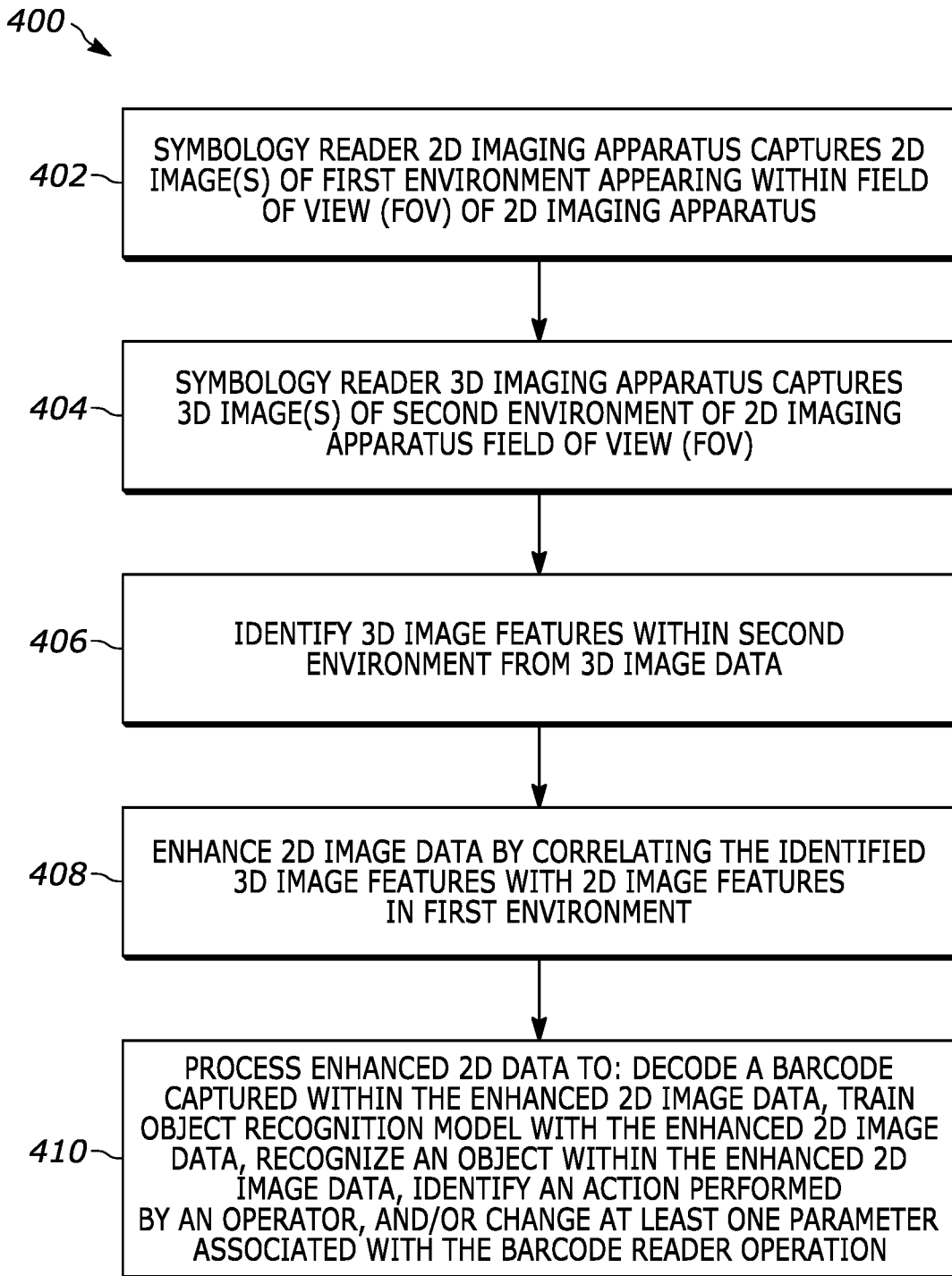
FIG. 8 is flowchart of an example process as may be implemented by the logic circuit of FIG. 7, for implementing example methods and/or operations described herein including techniques for barcode scanning using captured 2D and 3D images.

In FIG. 8, a flowchart is shown of an example process 400 for symbology reading using captured 2D images and captured 3D images as may be performed by the scanning station 302 of FIG. 7 and any of the imaging systems 100, 100', 100'', 140, 140'' and 200 of 1, 2, 3, 4A, 4B, 5, and 6, respectively. At a block 402, a symbology reader of an imaging system captures one or more 2D images through a 2D imaging apparatus of the symbology reader. In particular, 2D images are captured over a first environment within a FOV, where that first environment may be from a horizontally extending FOV of an upper portion of a bi-optic reader, from a vertically extending FOV of a lower portion of a bi-optic reader, from a FOV of a handheld symbology reader, or other example. At a block 404, a 3D imaging apparatus of the symbology reader captures one or more 3D images of another environment of a second FOV corresponding to the 3D imaging apparatus. The FOV of the 3D imaging apparatus may be from an upper portion or a lower portion of the bi-optic reader or from an externally positioned 3D imaging apparatus associated with a symbology reader, such as from a FOV extending downward overhead or from a side view pointing toward the symbology reader. The FOV may be that of a 3D imaging apparatus in a handheld symbology reader. In any event, in some examples, the 2D imaging apparatus and the 3D imaging apparatus have different FOVs that partially overlap. In some examples, the FOVs of the 2D imaging apparatus and the 3D imaging apparatus are the same.

In some examples, multiple 2D imaging apparatuses/assemblies may be used to capture 2D images, such as 2D imaging apparatuses in each of an upper portion and a lower portion of a symbology reader.

At a block 406, the imaging system analyzes 3D image data and identifies 3D image features within the environment captured in the FOV of the 3D imaging apparatus. For example, the 3D image data may be 3D point cloud data, and the 3D image features may be one or more geometric features of an object presented within the FOV and/or color or a color gradation corresponding an object within the FOV. In some examples, the identifying 3D image features includes identifying the one or more 3D image features that are positioned within a predetermined distance range away from the 3D imaging apparatus. In the imaging system 140 of FIG. 4A, for example, 3D imaging apparatus 144 may be configured to detect one or more objects captured in a 3D image of the FOV 150, determine the distance of the one or more objects, and determine if relevant objects are beyond a determined maximum distance, such as the distance plane 156. In the example, of a bi-optic barcode reader having a product-scanning region, the predetermined distance range away from the 3D imaging apparatus may extend from the 3D imaging apparatus to a distal boundary of the product-scanning region, e.g., distance plane 156. In some examples, the 3D image features include at least one of (i) at least a portion of an operator's hand, and (ii) an object grasped by the operator's hand.

In the example of a stationary barcode reader configured to be positioned within a workstation and operated by the operator, such as a handheld barcode reader like that of FIG. 6, the predetermined distance range away from the 3D imaging apparatus may extend from the 3D imaging apparatus to an edge of the workstation proximate the operator.

At a block 408, having analyzed the 3D image data and identifying 3D image features, the imaging system enhances the 2D image data by correlating the identified 3D image features with 2D image features identified from 2D image data of the 2D images captured in the environment of the FOV of the 2D imaging apparatus. For example, enhancing the 2D image data may include filtering one or more 2D image features such that processing the enhanced 2D image data excludes processing of image data associated with the at least one or more 2D image features. In some examples, enhancing the 2D image data further includes filtering the one or more 2D image features such that processing the enhanced 2D image data is limited to processing of image data associated with the at least one or more 2D image features. In these ways, 3D image features can be used to improve the processing of 2D images, removing the processing of 2D image features determined not be valuable for processing and/or identifying 2D image features that are valuable for processing.

Figure 9A:
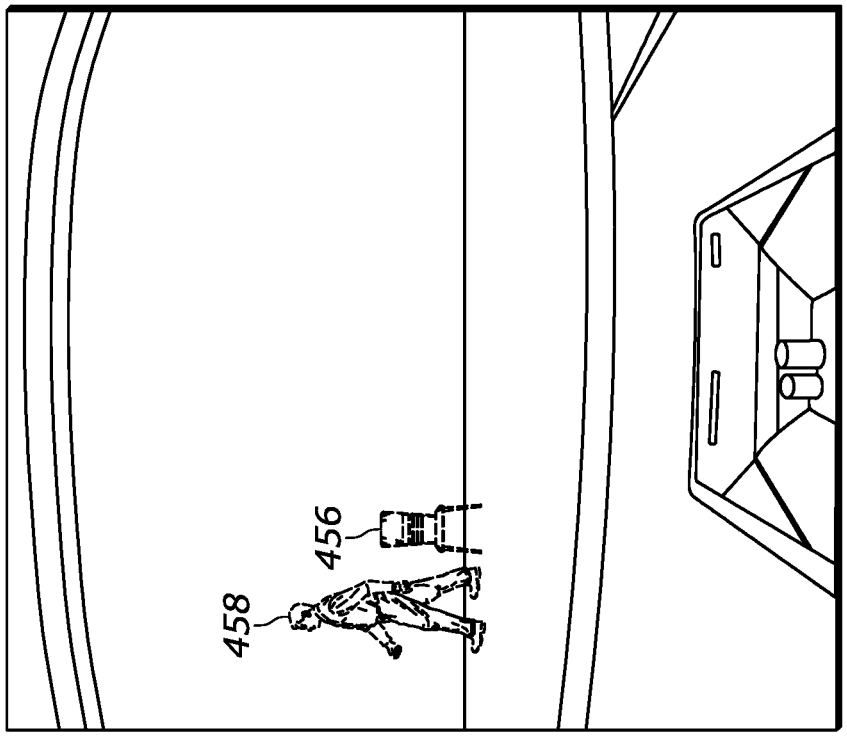
FIG. 9A illustrates a 2D image captured by a 2D imaging apparatus of a first field of view.

To illustrate an example, FIG. 9A illustrates a 2D image of a first environment of a FOV captured by a 2D imaging assembly of an imaging system, in this example from upper portion of the imaging system. The 2D image includes a barcode 450 associated with a target 452. The 2D image contains more than the target 452 and barcode 450. The 2D image includes a clerk 454 and background objects (e.g. chair 456, and person 458).

Figure 9B:
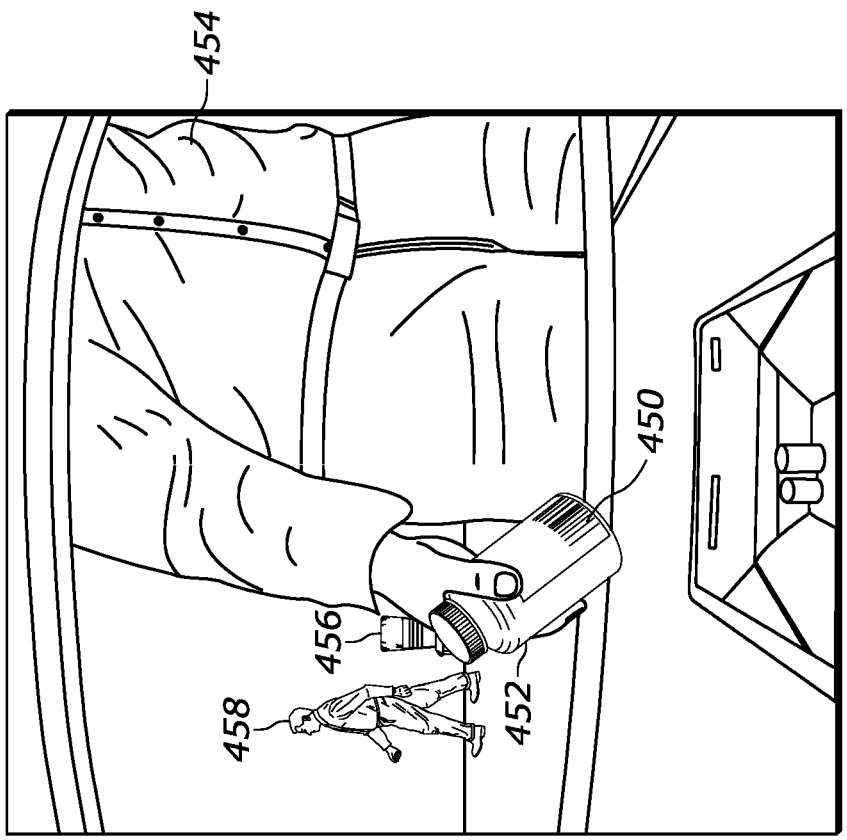
FIG. 9B illustrates a portion of a 3D image captured by a 3D imaging apparatus of a second field of view.

To enhance analysis of the 2D image in the example of FIG. 9A, the block 406 uses 3D image data of a 3D image captured over a FOV for a 3D imaging apparatus. For example, 3D image features corresponding to the objects 452-458 may be determined, such as the distance of each of the objects from a symbology reader. The FOV of the 3D image may be from an upper portion or a lower portion of a bi-optical reader or from an external, associated position, such as overhead. For example, at the block 406, the distance of the target 452, the clerk 454, the chair 456, and the person 458 may be determined. Further, at the block 406 it may be determined which of the objects are within an allowed scanning distance for a symbology reader and which ones are not so that the later can be removed. For illustration purposes, FIG. 9B shows an example portion of a 3D image where the chair 456 and the person 458 are identified as being outside of an allowed scanning distance, which the 3D imaging apparatus can determine from 3D point cloud data and determining 3D image features including geometric figures identify the shape of the object and distance of the object. In some examples, the 3D image features may be color or color gradation used to identify different objects in the 3D image. In some examples, the 3D image features include at least a portion of an operator's hand and an object grasped by the operator's hand. In some examples, identified 3D image features may be sent a trained neural network, having one or more trained object recognition models, for object identification. The object recognition models may be trained to identify different objects whether within or outside of an allowed scanning distance.

Figure 9C:
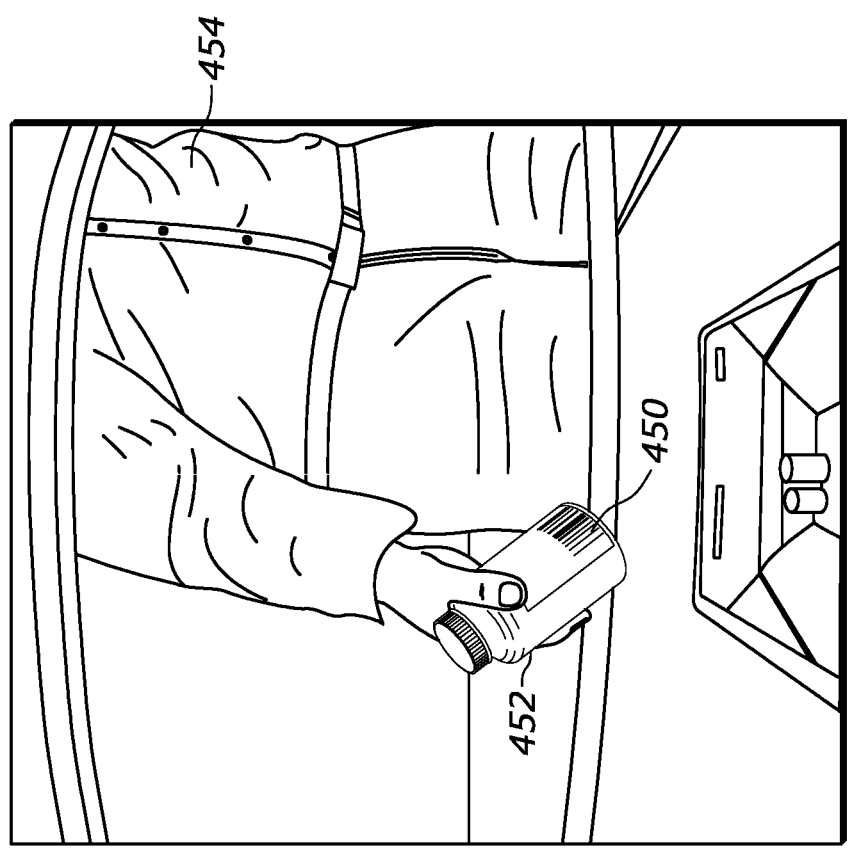
FIG. 9C illustrates an enhanced 2D image generated by extract image features associated with the 3D image.

With the distance data determined from the 3D image features, the 2D image of FIG. 9A may be converted into an enhanced 2D image as in FIG. 9C, at the block 408, by, in an example, removing from the 2D images objects that have distances outside of an allowed scanning distance, also referred to as a predetermined distance range of a product-scanning region herein. For example, a predetermined distance range away from the 3D imaging apparatus may extend from the 3D imaging apparatus to a distal boundary of the product-scanning region or to an edge of a workstation proximate to the operator or to a diffuser of an off-platter detection assembly.

For example, the enhanced 2D image of FIG. 9C has the chair 456 and the person 458 removed. In some examples, the block 408 compares identified 2D image features determined from 2D images and identified 3D image features determined from 3D images to identify objects for analysis.

The block 408 may enhance 2D image data such that certain image data (e.g., one or more objects) is excluded from further processing at block 410 or such that image processing is limited to certain image data.

Various processing may be advantaged as a result of generating enhanced 2D image data, including, as shown at block 410, decoding barcodes captured within the enhanced 2D image data (such as faster, more accurate decoding of the barcode 450), train object recognition models such as that of the trained neural network 364 using the enhanced 2D image data, perform object recognition using the enhanced 2D image data, identifying an action performed by an operator using the enhanced 2D image data, or change one or more parameters associated with operating the barcode reader.

For example, at the block 410, the action performed by the operator may be identified as one of presenting an object within a product-scanning region and presenting the object proximate to the product-scanning region. With the enhanced 2D image data, the block 410 may, responsive to no barcode being detected within at least one of the 2D image data and the enhanced 2D image data, generate an alert suitable for signaling a potential theft event. In the example of FIG. 9A, if the 2D imaging apparatus determines that the target 452 is present in 2D image data and within an allowed scanning distance (e.g., a product-scanning region), as determined from 3D image features, but that the barcode 450 is not present, is partially covered or not visible, or fully covered or not visible, and thus not fully decodable, then the block 410 may identify an operator as attempting a product-scan, and the block 410 may generate an alarm signal or other indication suitable for signaling a potential theft event.

In some examples, the block 410, responsive to analyzing the 2D image data using the 3D image features may adjust one or more parameters associated with symbology reader operation. Example features include an exposure time of the symbology reader, an illumination pulse duration of the symbology reader, a focus position of the symbology reader, an imaging zoom level of the symbology reader, and an illumination source of the symbology reader. For example, wherein the position of the target 452 is not detectable from 2D image data, by using 3D image features, the distance is determinable. Depending on that distance, the block 410 may switch for a direct illumination source used for barcode reading to a diffuse illumination source use for direct part marking (DPM) symbology reading. In some examples, the block 410 may adjust the brightness of an illumination assembly prior to capturing further 2D images. For example, if targets are close to the 3D imaging assembly then a reduce illumination brightness may be used. Or, if objects such as a facial data are identified in 3D images, then the illumination brightness may be reduced or the illumination assembly may be turned off.

One or more aspects of the processing operation of block 410 may be performed at the scanning station 302 or at the server 350, for example.

Figure 10:
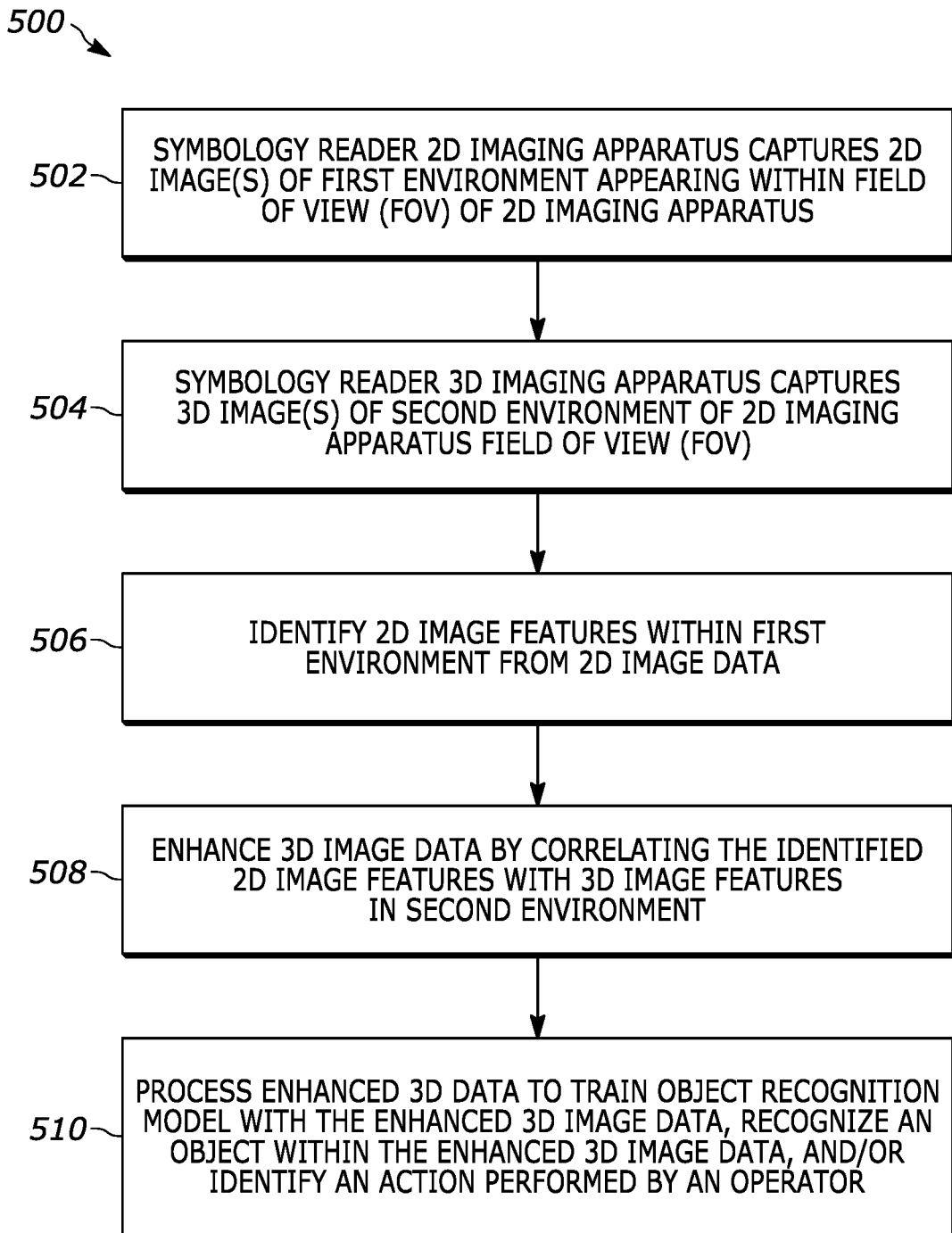
FIG. 10 is flowchart of an example process as may be implemented by the logic circuit of FIG. 7, for implementing example methods and/or operations described herein including techniques for processing data using captured 2D and 3D images.

In FIG. 10, a flowchart is shown of an example process 500 for symbology reading using captured 2D images and captured 3D images as may be performed by the scanning station 302 of FIG. 7 and any of the imaging systems 100, 100', 100", 140, 140" and 200 of 1, 2, 3, 4A, 4B, 5, and 6, respectively. At a block 502, similar to block 402, a symbology reader of an imaging system captures one or more 2D images through a 2D imaging apparatus of the symbology reader. In particular, 2D images are captured over a first environment within a FOV. At a block 504, similar to block 404, a 3D imaging apparatus associated with the symbology reader captures one or more 3D images of another environment of a second FOV corresponding to the 3D imaging apparatus.

At a block 506, the imaging system analyzes 2D image data and identifies 2D image features within the environment captured in the FOV of the 3D imaging apparatus. For example, the 2D image data may be monochrome image data, grayscale image data, and polychrome image data. The 2D image features may be a barcode and one or more geometric features of an object presented within the FOV of the 2D imaging apparatus. In some examples, the 2D image features include at least one of (i) at least a portion of an operator's hand, and (ii) an object grasped by the operator's hand, such as in the example of FIG. 9A the operator 454 and an operator's hand holding the target 452. In some examples, identifying 2D image features includes identifying environmental features on the 2D image, where these environmental features are features in the image outside of an object presented within the first FOV, such as in the example of FIG. 9A the chair 456 and the person 458. The block 506 may convert these environmental features into masking features configured to cover the identified environmental features in the 2D image and then identify these masking features as one or more 2D image features. In some examples, the block 506 identifies 2D image features by identifying a barcode for the object in the 2D image data and decoding the barcode to generate barcode payload data. From there, the block 506 may determine object identification from the barcode payload data and determine, from the object identification, one or more 2D image features, such as the shape and/or dimensions of the object.

At a block 508, having analyzed the 2D image data and identifying 3D image features, the imaging system enhances the 3D image data by correlating the identified 2D image features with 3D image features identified from 3D image data of the 3D image(s) captured in the environment of the FOV of the 3D imaging apparatus. For example, enhancing the 3D image data may include mapping a location of the barcode from the 2D image data to the 3D image data. In another example, enhancing the 3D image data may include mapping at least a portion of a polychrome image data to the 3D image data based at least in part on the one or more geometric features of the object presented within the FOV of the 2D imaging apparatus. In some examples, enhancing the 3D image data may include filtering one or more 3D image features such that processing the enhanced 3D image data excludes processing of image data associated with the at least one or more 3D image features. In some examples, enhancing the 3D image data may include filtering one or more 3D image features such that processing the enhanced 3D image data is limited to processing of image data associated with the at least one or more 3D image features. For example, shape and dimension data may be determined from a decoded barcode in the 2D image data and used to identify an object in the 3D image data corresponding to that shape and dimension. In some examples, enhancing the 3D image data includes filtering the 3D image databased on a predetermined distance range away from the 3D imaging apparatus. For example, for some handheld barcode readers, the predetermined distance range away from the 3D imaging apparatus extends from the 3D imaging apparatus to an edge of the workstation proximate the operator. For some bi-optic readers, the predetermined distance range away from the 3D imaging apparatus extends from the 3D imaging apparatus to a distal boundary of the product-scanning region. In these ways, 2D image features can be used to improve the processing of 3D images, removing the processing of 3D image features determined not be valuable for processing and/or identifying 3D image features that are valuable for processing.

Figure 11B:
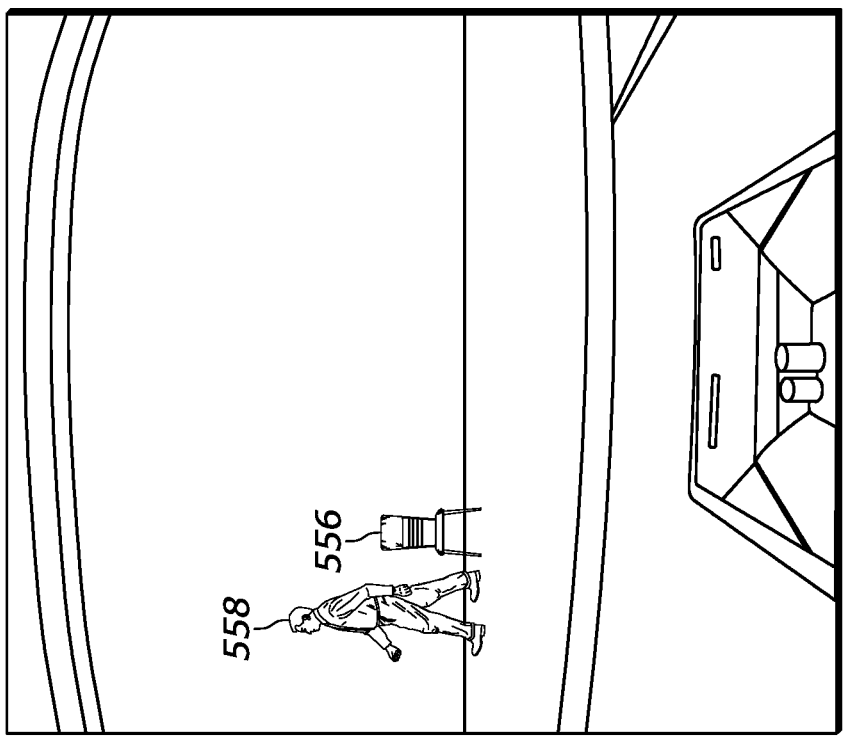
FIG. 11B illustrates a portion of a 2D image captured by a 2D imaging apparatus of a second field of view.
Figure 11A:
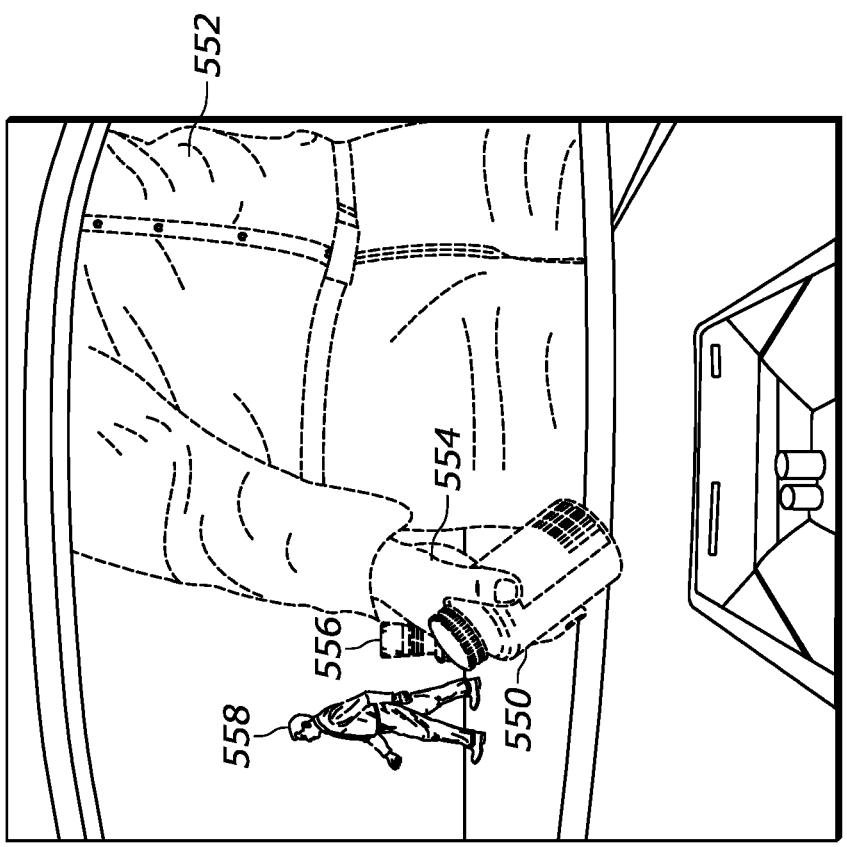
FIG. 11A illustrates a 3D image captured by a 3D imaging apparatus of a first field of view.
Figure 11C:
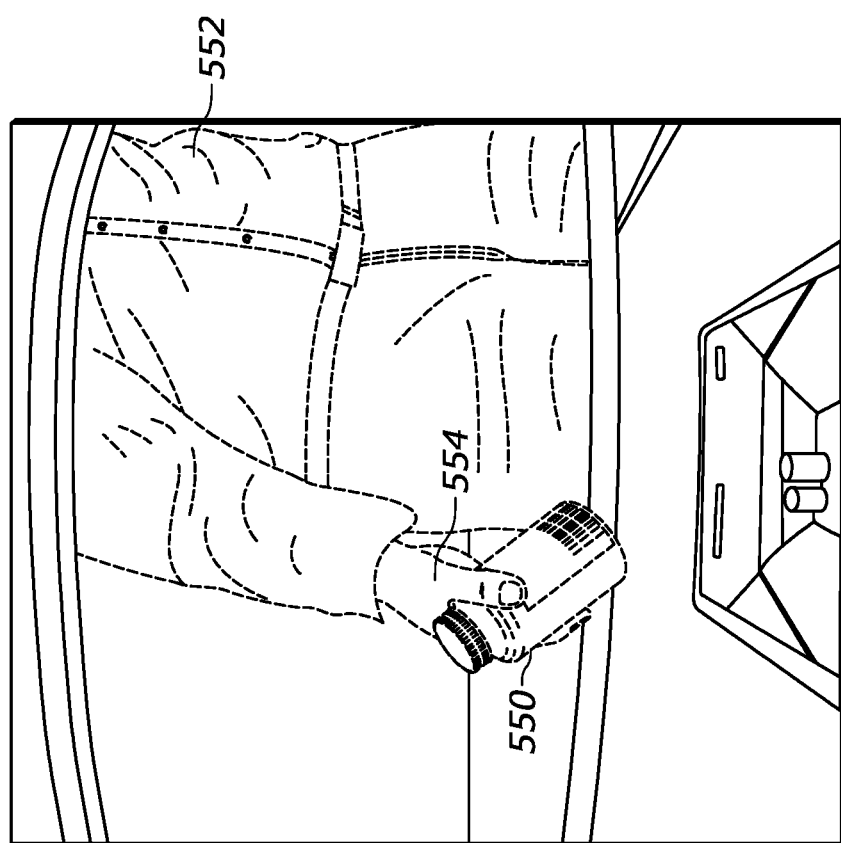
FIG. 11C illustrates an enhanced 3D image generated by extract image features associated with the 2D image.

FIG. 11A illustrates an example 3D image identifying a target 550 in an allowed scanning distance and operator 552 holding the target 550 in their hand 554. A chair 556 and a person 558 are also identified in the 3D image. FIG. 11B illustrates a filter mask developed from the 2D image features corresponding to the chair 556 and the person 558. FIG. 11C illustrates enhanced 3D image data where the 2D image features of FIG. 11B have been determined to be environmental features that are converted to masking features, and the corresponding 3D image data corresponding to these features has been removed to form the enhanced 3D image of FIG. 11C.

Various processing may be advantaged as a result, including, as shown at block 510, training object recognition models such as those of trained neural network 364 using enhanced 3D image data, performing object recognition using enhanced 3D image data, identifying an action performed by an operator, or and adjusting at least one parameter associated with the 3D imaging apparatus. For example, the block 510 may analyze the enhanced 3D image data identifying the action performed by the operator as one of presenting an object within a product-scanning region and presenting the object proximate to the product-scanning region. In response to no barcode being detected within the 2D image data, the process 510 may generate an alert suitable for signaling a potential theft event. One or more aspects of the processing operation of block 510 may be performed at the scanning station 302 or at the server 350, for example.

In some examples, the block 510 may provide the enhanced 3D image data to train an object recognition model of a neural network framework. For example, the block 506 may identify a barcode in 2D image data and determine a barcode detection event timeframe. The block 508 may generate enhanced 3D images as a 3D image captured corresponding to that barcode detection event timeframe, and the block 510 may provide that 3D image to train an object recognition model. In this example, only 3D image data corresponding to a symbology decoding event is used to train an object recognition model. Further, the 3D image used to train the object recognition model may be further enhanced by removing objects to generate an enhanced 3D image (e.g., FIG. 11C), which is used for training.

Further, in some examples, the block 510 adjusts one or more operating parameters of the symbology reader, e.g., one or more operating parameters of the 3D imaging apparatus such as the projected amount of illumination of the 3D imaging apparatus, the projected direction of illumination of the 3D imaging apparatus, the a source of illumination for the 3D imaging apparatus.

One or more aspects of the processing operation of block 510 may be performed at the scanning station 302 or at the server 350, for example.

Figure 12:
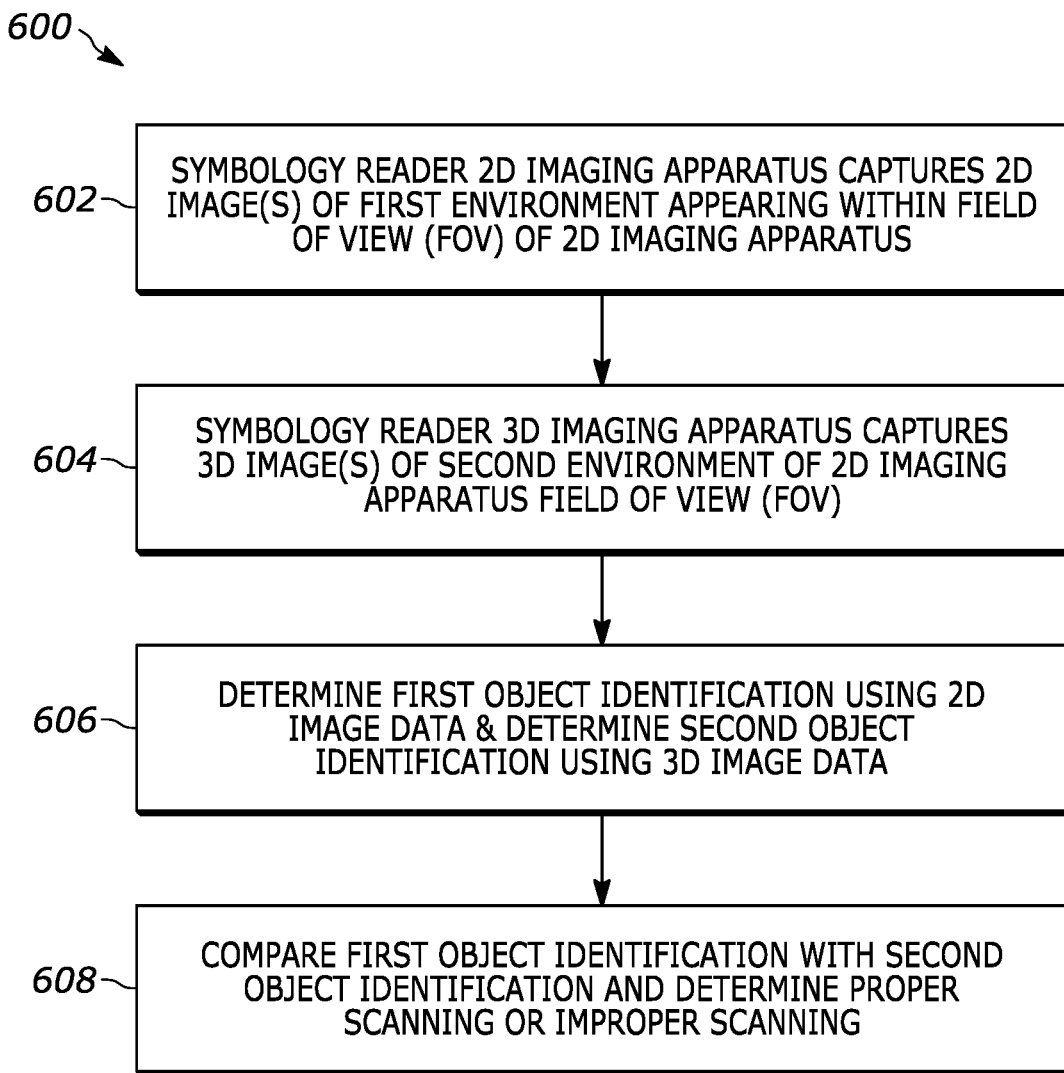
FIG. 12 is flowchart of an example process as may be implemented by the logic circuit of FIG. 7, for implementing example methods and/or operations described herein including techniques for identifying a proper scanning and improper scanning using captured 2D images and 3D images.

In FIG. 12, a flowchart is shown of an example process 600 for symbology reading using captured 2D images and captured 3D images as may be performed by the scanning station 302 of FIG. 7 and any of the imaging systems 100, 100', 100", 140, 140" and 200 of 1, 2, 3, 4A, 4B, 5, and 6, respectively. At a block 602, similar to block 402, a symbology reader of an imaging system captures one or more 2D images through a 2D imaging apparatus of the symbology reader. In particular, 2D images are captured over a first environment within a FOV. At a block 604, similar to block 404, a 3D imaging apparatus of the symbology reader captures one or more 3D images of another environment of a second FOV corresponding to the 3D imaging apparatus.

At a block 606, the imaging system determines first objection identification data using the captured 2D image data and second object identification data using the captured 3D image data. In some examples, both the first object identification data and the second object identification data are determined at a scanning station, e.g., at the symbology reader 304. In some examples, one or both of these object identification data are determined at a remote server, e.g., the server 350. For example, the first object identification data may be determined at a symbology reader, and the second object identification data may be determined by using a trained neural network stored at that symbology or stored remotely at the server 350.

In the illustrated example, at block 608, the imaging system compares the first object identification to the second object identification and determines that a proper scanning of the object has occurred when there is a match or determines that an improper scanning has occurred when there is no match. In some examples, in response to determining the proper scanning of the object, the block 608 may further include the imaging system (e.g., a POS, symbology reader, and/or remote server) processing a transaction log to include the data associated with the object. In some examples, in response to determining the improper scanning of the object, the imaging system may generate an alert suitable for signaling a potential theft event and/or process a transaction log to not include the data associated with the object.

The block 606 may be implemented in various ways. In an example, determining the first object identification of the object using the 2D image data includes identifying a barcode for the object in the 2D image data and decoding the barcode to generate barcode payload data, and determining the first object identification from the barcode payload data. In an example, determining the first object identification of the object using the 2D image data includes providing the 2D image data to a trained object recognition model, such as the trained neural network 364, and producing, using the trained object recognition model, the first object identification of the object. In an example, determining the second object identification of the object using the 3D image data includes providing the 3D image data to a trained object recognition model and producing, using the trained object recognition model, the second object identification of the object.

In another example of the block 606, before determining the first object identification of the object using the 2D image data, the imaging system compares 3D image data to 2D image data, and removes environmental features outside of the object from the 2D image data based on the 3D image data. In another example, before determining the second object identification of the object using the 3D image data, the imaging system compares the 3D image data to the 2D image data and removes environmental features outside of the object from the 3D image data based on the 2D image data.

In yet another example of the block 606, determining the second object identification of the object using the 3D image data includes, determining one or more color features of the object from the 3D image data and from that determining the second object identification from the one or more color features. These color features may include the color and or color gradient of an object. Such functionality may be used to identify different produce for example by examining the color and/or color gradient of captured 3D image data of that produce.

In another example of the block 606, determining the second object identification of the object using the 3D image data includes determining one or more geometric features of the object from the 3D image data and determining the second object identification from the one or more geometric features.

In another example, determining the first object identification of the object using the 2D image data includes identifying a barcode for the object in the 2D image data and decoding the barcode to generate barcode payload data and determining the first object identification from the barcode payload data. Where the 3D image data includes a point cloud having a plurality of data points, each data points having a distance value associated with a distance from the 3D imaging apparatus may be determined from one or more geometric features of the object. For example, the block 606 may determine that one or more geometric features of the object from the 3D image data are based on a first subset of the 3D image data and not based on a second subset of the 3D image data. The first subset of the 3D image data may be associated with a first subset of the data points having the respective distance value associated with the distance from the 3D imaging apparatus being within a predetermined range, and the second subset of the 3D image data may be associated with a second subset of the data points having the respective distance value associated with the distance from the 3D imaging apparatus being outside of the predetermined range.

In this way, in some examples, 3D image features may be used with 2D image features to identify an object attempting to be scanned and determine whether the object scan attempt is within an allowed scanning distance. In the example of FIG. 9A, the barcode 450 (as a first object identification data) may be identified in a 2D image and the location of the target 452 associated with the barcode 450 may be identified from 3D image data, along with the distance between the target 452 and the symbology reader (as a second object identification data). If that distance is shorter than an allowed scanning distance, e.g., shorter than the distance of plane 152 in the example of FIG. 4A or longer than the distance plane 156 (the region of the FOV between the planes 152 and 156 defining an allowed scanning distance in this example), then the block 608 comparing the first and second object identification data may determine that an improper scan attempt has been attempted and thereby block decoding of the barcode 450 and/or blocking the inclusion of the target 452 and barcode 450 in a transaction log associated with the scanning station.

In another example, the block 604 may identify a scannable object using the 3D image data, and if the block 606 fails to determine an object identification of the object using the 2D image data, the block 608 may determine an improper scanning of the object and generating an alarm signal. For example, a 2D image may be captured at the block 602, but that 2D image may not have any barcode visible or only a partial barcode visible, e.g., where an operator covers all or part of the barcode. Upon detecting the presence of an object being scanned over an allowed scanning distance in the FOV of the 3D imaging apparatus, as determined at block 604, the block 606 will attempt to identify the object scanned in the 2D image data and in the 3D image data, i.e., by determining a first and second object identification, respectively. The second object identification may be the physical shape, distance, or product classification (i.e., from a trained object recognition model). If a first object identification cannot be determined, however, (e.g., when no barcode can be properly decoded from the 2D image), the block 608 determines an improper scanning and generates an alarm signal.

Figure 13:
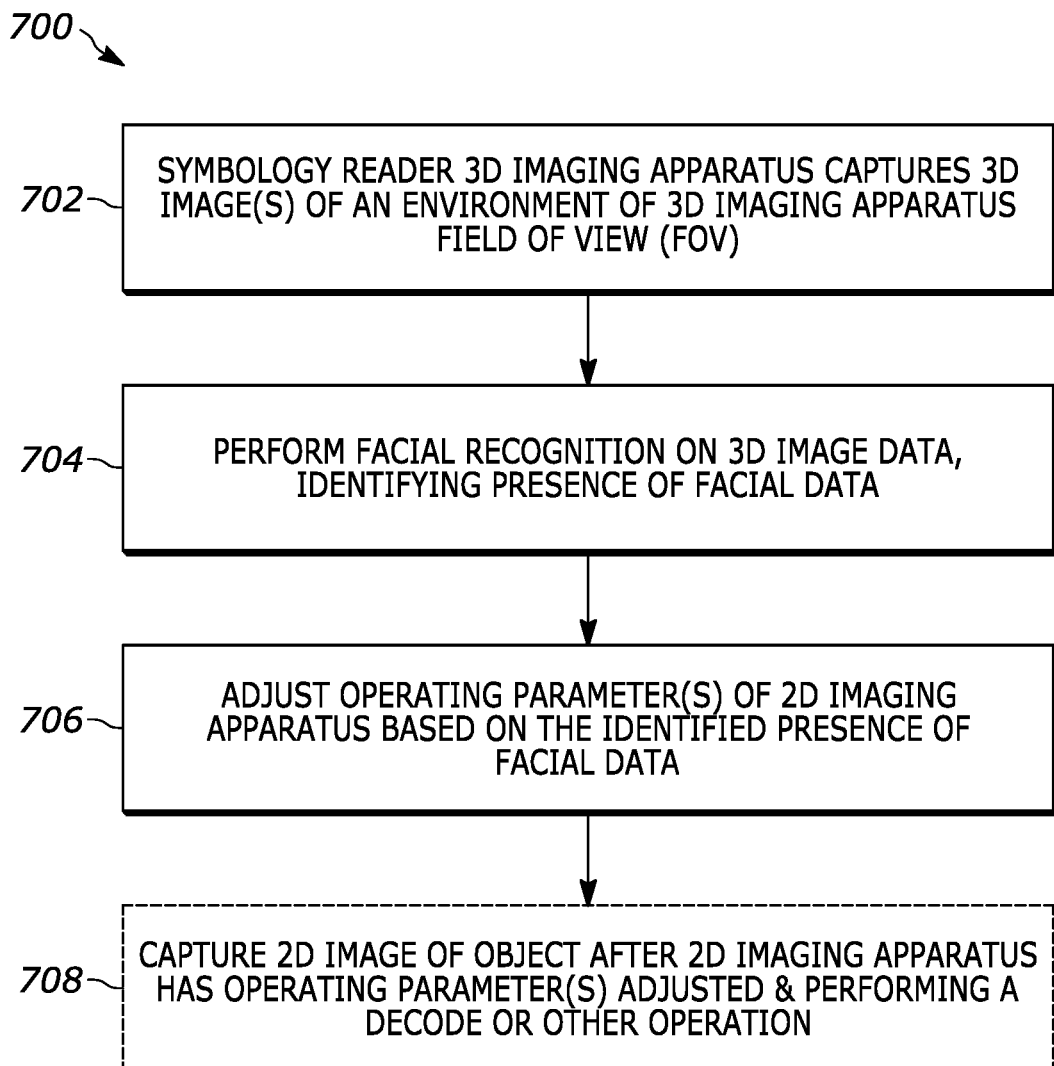
FIG. 13 is flowchart of an example process as may be implemented by the logic circuit of FIG. 7, for implementing example methods and/or operations described herein including techniques for performing facial recognition using captured 3D images.

FIG. 13 is a flowchart is shown of an example process 700 for symbology reading using captured 3D images as may be performed by the scanning station 302 of FIG. 7 and any of the imaging systems 100, 100', 100", 140, 140" and 200 of 1, 2, 3, 4A, 4B, 5, and 6, respectively. For example, the process 700 may be implemented by a symbology reader having a 3D imaging apparatus, with or without having an additional 2D imaging apparatus. At a block 702, a symbology reader of an imaging system captures one or more 3D images through a 3D imaging apparatus associated with the symbology reader. In particular, 3D images are captured over an environment within a FOV of the 3D imaging apparatus. At a block 704, the imaging system performs facial recognition on the 3D image data identifying the presence of facial data within the environment. The facial recognition may be performed by examining point cloud data, for example, and identifying geometric features and comparing them to a trained object identification model, to a 3D anthropometric data model stored at a scanning station or at a remote server, or to other models for identifying facial features. By using models having three-dimensional data, more accurate facial recognition can be performed.

In response to the identification of the presence of the facial data, at a block 706, the imaging system adjusts one or more operating parameters of the imaging apparatus based on the presence of that facial data. In some examples, the block 706 adjusts one or more operating parameters of a 2D imaging apparatus within the imaging system. In an example, the block 706 adjusts operating parameters of a 2D imaging apparatus of a handheld barcode reader reducing intensity of at least one of an illumination assembly and an aiming assembly that may also be included in a symbology reader. In another example of a handheld barcode reader, the block 706 may adjust the operating parameter of the 2D imaging apparatus by preventing activation of at least some portion of the 2D imaging apparatus until a subsequent performing of facial recognition on a subsequent 3D image data associated with a subsequent 3D image fails to identify another presence of facial data in the subsequent 3D image data.

In some examples, the process 700 may further include a block 708 capturing a 2D image of an object using a 2D imaging apparatus that has an operating parameter that has been adjusted at the block 706. The imaging system may then decode a barcode in the captured 2D image to identify an object.

In some examples, the block 704 identifies the presence of the facial data in the 3D image data by determining a position of the facial data in a FOV of the 3D imaging apparatus, and the block 706 adjusts the operating parameters of the 2D imaging apparatus by adjusting the operating parameters based on the position of the facial data. In some examples, the operating parameter adjusted at block 706 is a FOV of the 2D imaging apparatus. For example, the FOV of the second imaging apparatus can be adjusted to exclude locations where the facial data would reside in environment of the FOV. In some examples, the operating parameter adjusted at block 706 is a focal distance of the 2D imaging apparatus, for example to adjust where the 2D imaging apparatus focuses for capturing 2D images of an object and/or for identifying a barcode in an object. In some examples, the operating parameter is an exposure time, an illumination pulse duration, a focus position, or an imaging zoom level of the 2D imaging apparatus.

Figure 14B:
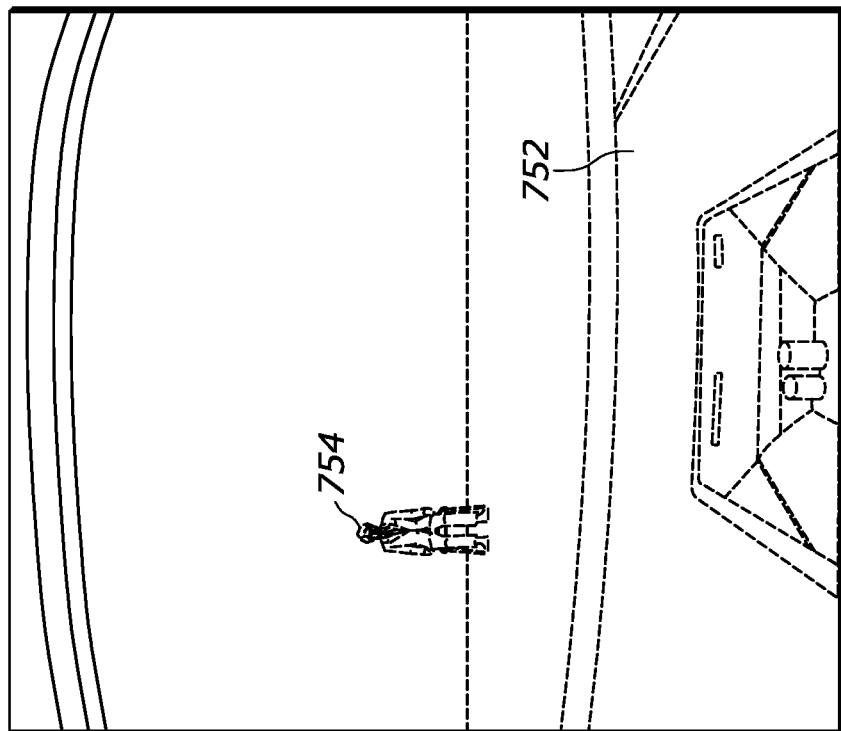
FIG. 14B illustrates a 3D image captured by the 3D imaging apparatus of the field of view and showing a face at a second distance from the 3D imaging apparatus in a scanning station.
Figure 14A:
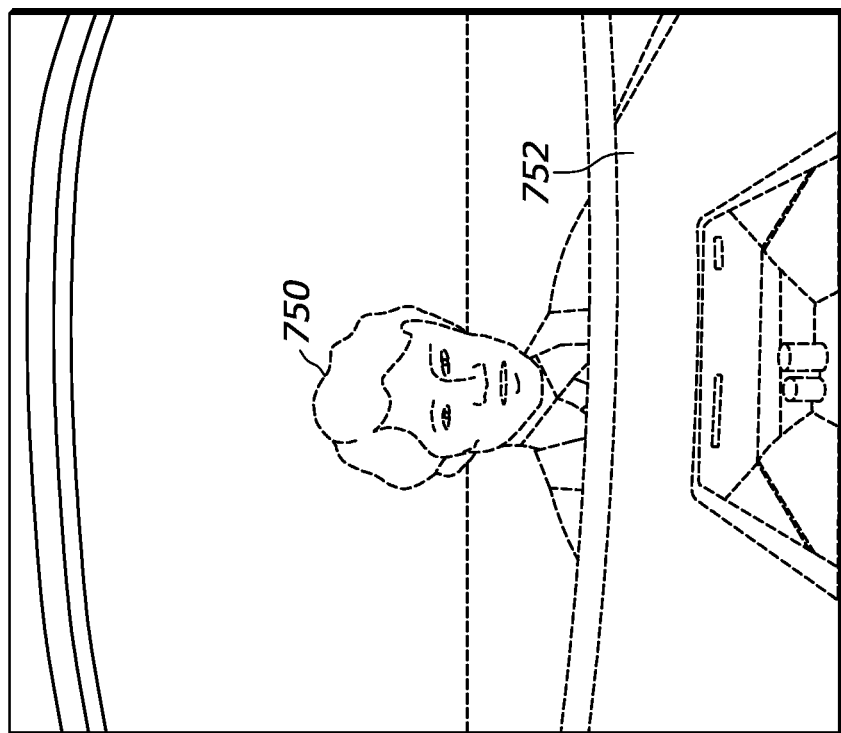
FIG. 14A illustrates a 3D image captured by a 3D imaging apparatus of a field of view and showing a face at a first distance from the 3D imaging apparatus in a scanning station.

FIG. 14A illustrates an example 3D image of a first environment of a FOV of the 3D imaging apparatus. FIG. 14B illustrates an example 3D of a second environment. In the first environment of FIG. 14A, a face 750 is recognized at a first distance adjacent a platter 752 of a symbology reader, whereas in the second environment of FIG. 14B, a face 754 is recognized at a second distance far from the platter 752. Based on the identification of the facial data at the block 704, for the 3D image capturing the environment in FIG. 14A, the block 706, identifying a face, such as the face of a child standing at bi-optic reader height, may adjust an operating parameter of a 2D imaging apparatus to protect the person from being illuminated by light from an illumination assembly. For example, the block 706, responding to the environment of FIG. 14B, may disable the symbology reader from performing a barcode scanning attempt. The block 706 may adjust an exposure time, an illumination pulse duration, or an imaging zoom level of a 2D imaging apparatus to protect the person before passing control to block 708 for capturing a 2D image.

Figure 15:
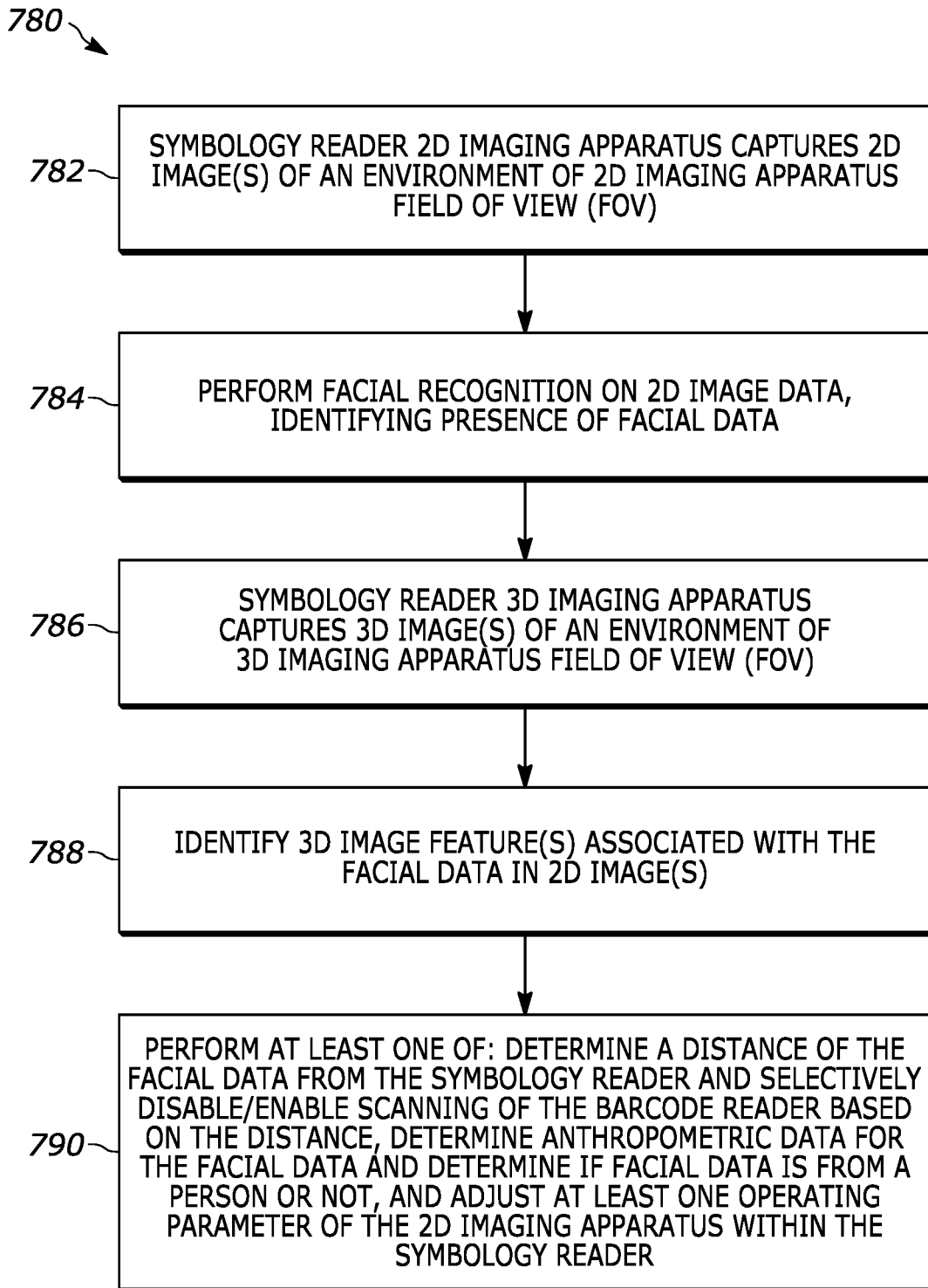
FIG. 15 is a flowchart of an example process as may be implemented by the logic circuit of FIG. 7, for implementing example methods and/or operations described herein including techniques for performing facial recognition using captured 2D images.

A similar process may be performed using 2D image data and facial recognition. FIG. 15 is a flowchart showing an example process 780. At block 782, 2D images are captured by a 2D imaging assembly, and at a block 784 facial recognition is performed on the 2D images. For example, an imaging processor may be configured to use a 2D anthropometric data model stored at a scanning station to determine if edge data or other contrast identified in the 2D image corresponds to facial data. At a block 786, 3D image data is captured, and a block 788 compares the 2D image data and the 3D image data to identify 3D image features associated with the facial data in the 2D image data. If 3D features are identified, then a block 790 performs one or more different functions, in particular, determining a distance of the facial data from the barcode reader and selectively disabling/enabling scanning of the barcode reader based on the distance, determining anthropometric data for the facial data and determining if facial data is from a person or not, and adjust at least one operating parameter of the 2D imaging apparatus within the barcode reader. As with the process 700, example operating parameters include an exposure time, an illumination pulse duration, a focal distance, or an imaging zoom level.

Figure 16:
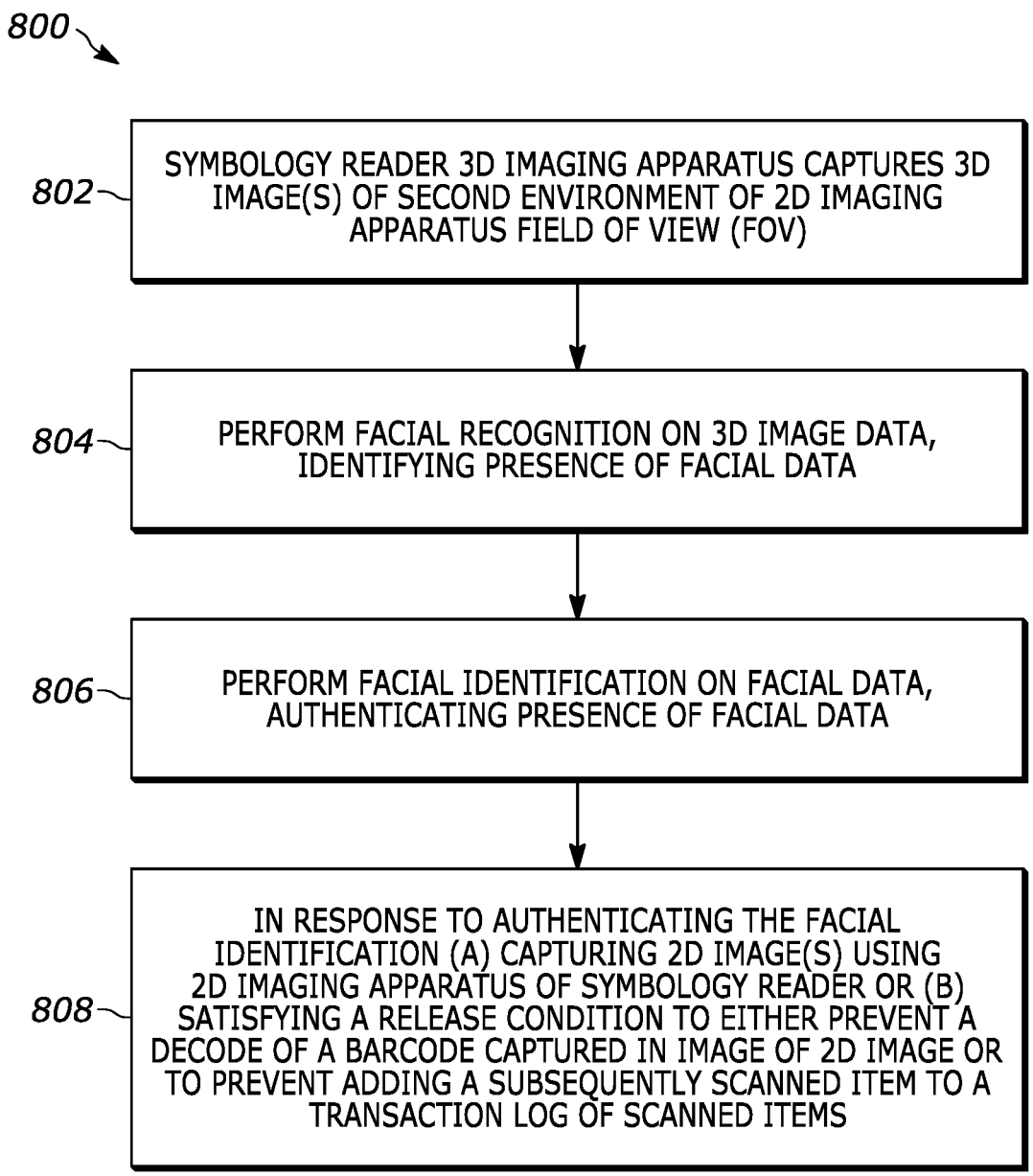
FIG. 16 is a flowchart of an example process as may be implemented by the logic circuit of FIG. 7, for implementing example methods and/or operations described herein including techniques for performing facial recognition using captured 3D images.

FIG. 16 is a flowchart is shown of an example process 800 that may performed by a scanning station, such as at a point-of-sale, that scanning station having 3D imaging apparatus associated therewith, as may be performed by the scanning station 302 of FIG. 7 and any of the imaging systems 100, 100', 100", 140, 140" and 200 of 1, 2, 3, 4A, 4B, 5, and 6, respectively. For example, the process 800 may be implemented by a symbology reader associated with a 3D imaging apparatus, with or without having an additional 2D imaging apparatus. At a block 802, similar to block 702, a symbology reader of an imaging system captures one or more 3D images through a 3D imaging apparatus of the symbology reader. In particular, 3D images are captured over an environment within a FOV of the 3D imaging apparatus. At a block 804, similar to block 704, the imaging system performs facial recognition on the 3D image data identifying the presence of facial data within the environment.

At a block 806, the imaging system performs facial identification on the facial data from block 704. In particular, the block 806 attempts to authenticate facial identification. In response to the facial identification being authenticated, then at a block 808 the 2D imaging apparatus may be used to capture 2D images of object in an environment of a FOV of the 2D imaging apparatus. In an example, authenticating the facial identification is achieved by comparing the facial identification to an authorized user database. In an example, authenticating the facial identification is achieved by determining that the facial data is at an acceptable distance from the 3D imaging apparatus. For example, facial data 750 in FIG. 14A may result in an non-authentication, preventing the capture of 2D images using a 2D imaging apparatus, whereas the facial data 754 may resulting in authentication. In some examples, before performing facial recognition on the 3D image data, the block 806 may identify environmental features in the 3D image data, the environmental features being features in the 3D image outside of the object, and the process 800 may remove environmental features from the 3D image data.

The block 808 may be configured to perform a number of operations in response to authenticating facial data. After capturing 2D images, the block 808 may capture 2D images using a 2D imaging apparatus of the scanning station. That is, in some examples, the block 808 is configured to allow 2D images and object scanning in response to facial data authentication. In some examples, the block 808 may be configured to prevent subsequent 2D image capture. For example, the block 808 may authenticate the facial data and satisfy a release condition that prevents a decode of a barcode captured in image of 2D image. Or the block 808 may allow a 2D image and barcode decoding to occur, but the block may prevent adding a subsequently scanned item to a transaction log of scanned items at the point-of-sale. For example, if facial data indicates than un-authorized user, e.g., a minor, is attempting to scan an image, the block 808 may prevent a 2D image from being captured or allow a 2D image to be captured but prevent decoding of any barcode in the image. In some examples, the authentication may be agnostic and prevent any decoding of a barcode in a 2D image. In some examples, the authentication may prevent such decoding only for certain types of objects, such as alcohol or other age inappropriate items. In such examples, the block 808 may allow for a 2D image to be capture, a barcode to be identified and decoded, and then depending on the object identified by that decoding, determine if the release condition is satisfied such that the decoded barcode is not added to a transaction log at the point-of-sale scanning station, thereby preventing the minor from affecting the scanning and purchase of the object.

While the example processes of FIGS. 15 and 16 are described in the context of a symbology reader and scanning station, the processes described may be implemented in any image based authentication system or fraud detection system, such as an automated kiosk for purchasing dispensed items, an automated cash station or teller, or other system.

Figure 17:
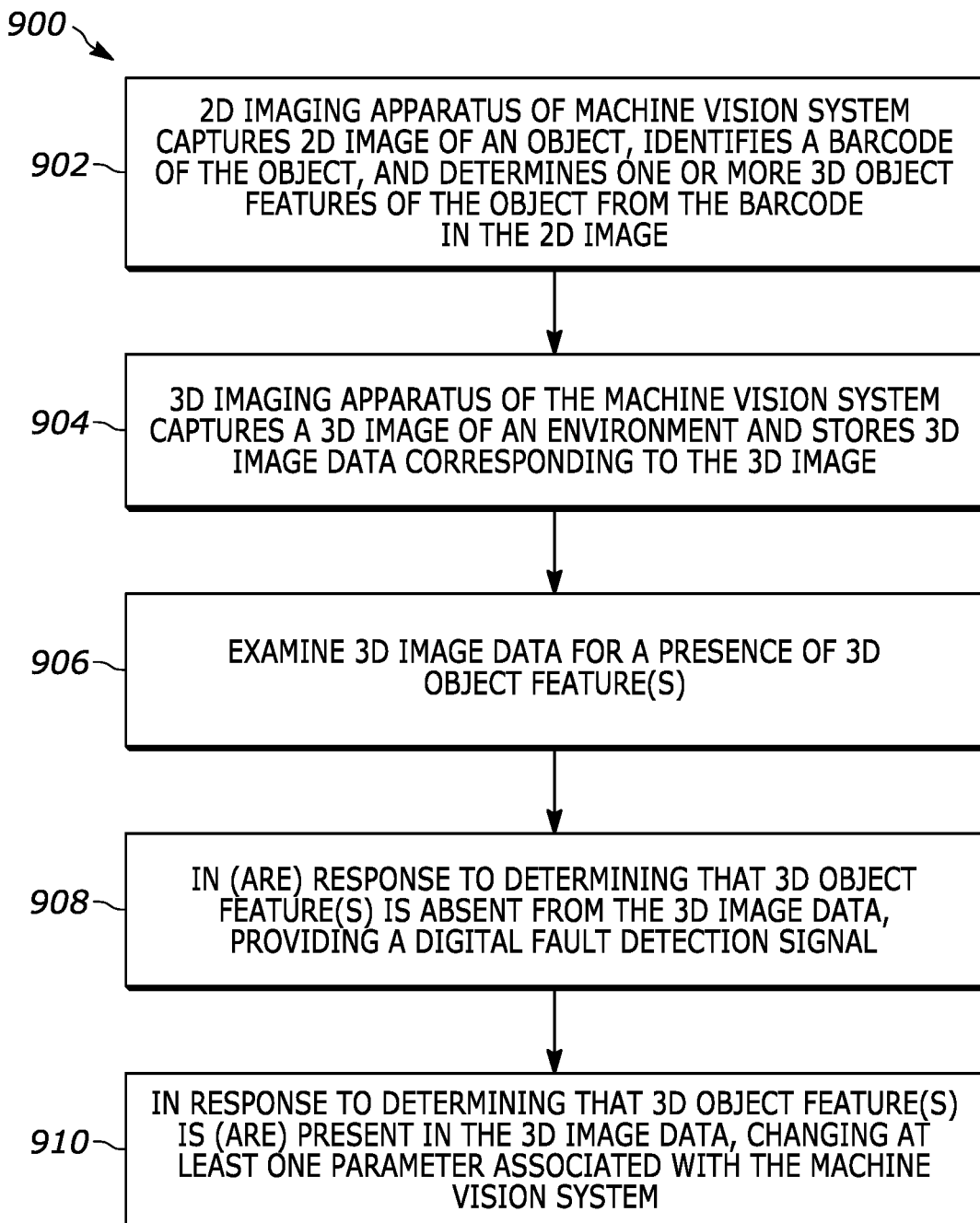
FIG. 17 is flowchart of another example process as may be implemented by a logic circuit of FIG. 18 in machine vision system, for implementing example methods and/or operations described herein including techniques for performing facial recognition using captured 3D images.
Figure 18:
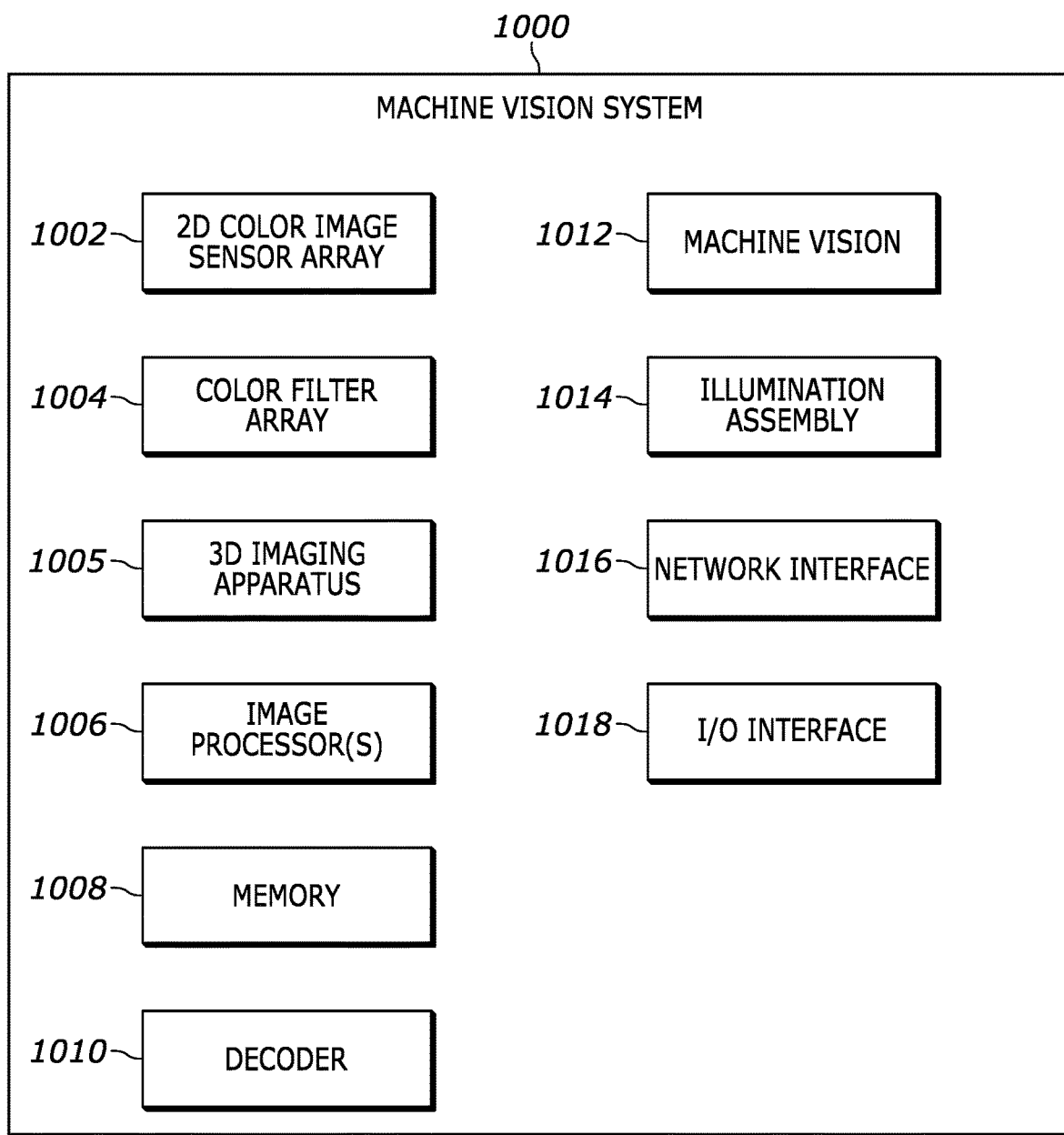
FIG. 18 illustrates a block diagram of an example machine vision system for implementing example methods and/or operations described herein including machine vision analysis using captured 2D and 3D images.

In various examples, the techniques of the present invention can be implemented in other scanning application, including, for example, in machine vision applications. In FIG. 17, a flowchart is shown of an example process 900 for object scanner, e.g., as may be performed by a machine vision system, using captured 2D images and captured 3D images as may be performed by a machine vision system such as the scanning station 302 implemented as a machine vision system. FIG. 18 illustrates an example logic circuit implemented at an example machine vision system 1000. In the illustrated example, the machine vision system 1000 includes a 2D color image sensor array 1002 generally configured to sense 2D image data within a FOV of a 2D imaging apparatus. More particularly, the color image sensor array 1002 may be associated with a color filter array 1004 that includes color filters respectively associated with the individual image sensors of the color image sensor array 1002. For example, a first image sensor of the color image sensor array 1002 may be associated with a green filter and a second image sensor of the color image sensor array 1002 may be associated with a red filter. The pattern of color filters that form the color filter array 1004 may be a Bayer pattern. As illustrated, the machine vision system 1000 also includes an illumination assembly 1014 configured to produce an illumination light directed toward the imaging FOV of the 2D color image sensor array 1004. For example, the illumination assembly 1014 may include one or more light emitting diodes (LEDs) or other types of light sources. In some embodiments, the illumination assembly 1014 is configured to emit white light (e.g., light that includes wavelengths across the entire visible spectrum). The illumination assembly 1014 may include multiple illumination sources, such as a direct illumination source and a diffuse illumination source. In some examples, the illumination assembly 1014 includes illumination sources emitting at different wavelengths, such as a red light illumination source, a green light illumination source, a blue light illumination source, and/or a white light illumination source. As such, in various examples, the 2D color image sensor array 1002 is capable of sensing the full range of light reflections. The machine vision system 1000 includes a 3D imaging apparatus 1005 for capturing 3D images of an environment in a FOV of the 3D imaging apparatus.

Further, the machine vision system 1000 includes one or more image processors 1006 capable of executing instructions to, for example, implement operations of the example methods described herein, as may be represented by the flowcharts of the drawings that accompany this description. The image processors 1006 may be one or more microprocessors, controllers, and/or any suitable type of processor. The example machine vision system 1000 includes a memory (e.g., volatile memory, non-volatile memory) 1008 accessible by the image processors 1006 (e.g., via a memory controller). The example machine vision system 1000 also includes a decoder 1010 and a machine vision module 1012 configured to analyze 2D and 3D image data including image data that have been processed by the image processors 1006. The example decoder 1010 is configured to determine whether the 2D image data from the 2D color image sensor array 1002 is representative of a barcode, and if so, decode the barcode to determine the encoded information. The example machine vision module 1012 is configured to perform object recognition techniques on the 2D image data and/or 3D image data to identify target features thereof. For example, the machine vision module 1012 may be configured to detect target features such as cracks on an object and/or an incomplete soldering connection for a pin of a microchip as determined from either or both of 2D image data and 3D image data. In some examples, the machine vision module 1012 may be configured to detect features using 2D image data enhanced with 3D image data or 3D image data enhanced using 2D image data.

The example machine vision system 1000 also includes a network interface 1016 to enable communication with other machines via, for example, one or more networks, and input/output (I/O) interfaces 1018 to enable receipt of user input and communication of output data to the user. For example, the output data may be the encoded information determined by the decoder 1010 and/or an indication of the features detected by the machine vision module 1012.

Returning to FIG. 17, at a block 902, a 2D imaging apparatus of a machine vision system (such as the 2D color image sensory array 1002) captures a 2D image of an object over a FOV. The machine vision system identifies a barcode of the object in the 2D image and determines one or more 3D object features of the object from the barcode. For example, the block 902 may decode the barcode, identify an associated object, and determine 3D features of the object, such as geometric features, such as the shape, surfaces, and/or dimensions of the object. At a block 904, a 3D imaging apparatus of the machine vision system (such as the 3D imaging apparatus 1005) captures 3D image(s) of an environment over a FOV and stores the 3D image data corresponding to the 3D image(s). At a block 906, the 3D image data is examined by the machine vision system (e.g., by the machine vision module 1012) to identify the presence of one or more 3D object features, such as those discussed hereinabove. In response to determining the presence of one or more 3D object features, a block 908 provides a digital fault detection signal to a user of the machine vision system. In the illustrated example, if the block 908 determines that the 3D object features determined from the block 902 are not present in the 3D image data from block 906, a digital fault detection signal is provided to a user. In an example, determining 3D object features from the barcode in the 2D image is performed by decoding the barcode to generate barcode payload data and determining object identification from the barcode payload data and determining, from the objecting identification, the one or more 3D object features of the object. In another example, determining the 3D object features of the object from the barcode in the 2D image is performed by determining an orientation of the object from a location of the barcode in the 2D image and determining, from the orientation of the object, the one or more 3D object features as a subset of available 3D object features. In some examples, the 3D object features include at least one of a dimensional feature and a shape feature.

If no fault is detected at block 908, at block 910, if it is determined that the 3D object features determined from the block 902 are present in the 3D image data from block 906, the block 910 may determine if a change is to be made to at least one parameter associated with the machine vision system. In this way, the block 910 may use color data from a 2D color image sensor array to perform color checking from which the block 910 determines if an illumination source should be changed to better illuminate an object under inspection by the machine vision system. The block 910 may assess 2D image data and 3D image data to determine properties such as the orientation, lighting, and position of an object and then adjust the illumination source, the direction of the illumination, the wavelength of the illumination source (e.g., using illumination sources of different wavelengths). For example, the block 910 and determine, optimal illumination conditions, such as illumination color, intensity, and/or direction values for a 'golden unit' machine vision scanning and use change parameters to those optimal illumination conditions. In this way, color data, such as the presence of the color red determined from 2D image data can be used to adjusting illumination conditions for performing machine vision scans with the 2D imaging apparatus or the 3D imaging apparatus. In other examples, the color data may be determined from 3D image data captured by the 3D imaging apparatus. The process 900 allows a machine vision system to captured data from 2D imaging apparatus and a 3D imaging apparatus, compare the resulting 2D image data and 3D image data and determine changes in operating parameters of the machine vision system to quickly, on the fly, adjust the machine vision system to capture images under improved conditions thereby increasing accuracy and scanning throughput of these systems.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method of identifying a proper scanning of an object or an improper scanning of the object using a barcode reader, the method comprising:
   capturing, using a two-dimensional (2D) imaging apparatus within the barcode reader and having a first field of view (FOV), a 2D image of a first environment appearing within the first FOV and storing 2D image data corresponding to the 2D image;
   capturing, using a three-dimensional (3D) imaging apparatus associated with the barcode reader and having a second FOV that overlaps at least partially with the first FOV, a 3D image of a second environment appearing within the second FOV and storing 3D image data corresponding to the 3D image;
   determining a first object identification of the object using the 2D image data;
   determining a second object identification of the object using the 3D image data; and
   comparing the first object identification with the second object identification, and determining (a) the proper scanning of the object when the first object identification matches the second object identification and (b) the improper scanning of the object when the first object identification does not match the second object identification.

2. The method of claim 1, wherein the determining the first object identification of the object using the 2D image data comprises:
   identifying a barcode for the object in the 2D image data; and
   decoding the barcode to generate barcode payload data and determining the first object identification from the barcode payload data.

3. The method of claim 1, wherein the determining the first object identification of the object using the 2D image data comprises:
   providing the 2D image data to a trained object recognition model; and
   producing, using the trained object recognition model, the first object identification of the object.

4. The method of claim 1, wherein the determining the second object identification of the object using the 3D image data comprises:
   providing the 3D image data to a trained object recognition model; and
   producing, using the trained object recognition model, the second object identification of the object.

5. The method of claim 1, wherein before determining the first object identification of the object using the 2D image data, the method further comprises:
   comparing the 3D image data to the 2D image data; and
   removing environmental features outside of the object from the 2D image data based on the 3D image data.

6. The method of claim 1, wherein before determining the second object identification of the object using the 3D image data, the method comprises:
   comparing the 3D image data to the 2D image data; and
   removing environmental features outside of the object from the 3D image data based on the 2D image data.

7. The method of claim 1, wherein determining the second object identification of the object using the 3D image data comprises:
   determining one or more color features of the object from the 3D image data; and
   determining the second object identification from the one or more color features.

8. The method of claim 7, wherein the one or more color features comprise a color of the object.

9. The method of claim 7, wherein the one or more color features comprise a color gradient of the object.

10. The method of claim 1, wherein determining the second object identification of the object using the 3D image data comprises:
    determining one or more geometric features of the object from the 3D image data; and
    determining the second object identification from the one or more geometric features.

11. The method of claim 10, wherein the determining the first object identification of the object using the 2D image data comprises:
    identifying a barcode for the object in the 2D image data; and
    decoding the barcode to generate barcode payload data and determining the first object identification from the barcode payload data.

12. The method of claim 11, wherein the 3D image data includes a point cloud comprising a plurality of data points, each of the data points having a distance value associated with a distance from the 3D imaging apparatus, and
    wherein the determining the one or more geometric features of the object from the 3D image data is based on a first subset of the 3D image data and is not based on a second subset of the 3D image data, the first subset of the 3D image data being associated with a first subset of the data points having the respective distance value associated with the distance from the 3D imaging apparatus being within a predetermined range, the second subset of the 3D image data being associated with a second subset of the data points having the respective distance value associated with the distance from the 3D imaging apparatus being outside of the predetermined range.

13. The method of claim 1, wherein, responsive to the determining (a) the proper scanning of the object, the method further comprises processing a transaction log to include the data associated with the object, and responsive to the determining (b) the improper scanning of the object, the method further comprises at least one of (i) generating an alert suitable for signaling a potential theft event, and (ii) processing the transaction log to not include the data associated with the object.

14. A method of identifying an improper scanning of the object using a barcode reader, the method comprising:

capturing, using a two-dimensional (2D) imaging apparatus within the barcode reader and having a first field of view (FOV), a 2D image of a first environment appearing within the first FOV and storing 2D image data corresponding to the 2D image;

capturing, using a three-dimensional (3D) imaging apparatus associated with the barcode reader and having a second FOV that overlaps at least partially with the first FOV, a 3D image of a second environment appearing within the second FOV and storing 3D image data corresponding to the 3D image;

identifying a scannable object using the 3D image data; and upon failing to determine an object identification of the object using the 2D image data, determining an improper scanning of the object and generating an alarm signal.

15. The method of claim 14, wherein before the identifying the scannable object using the 3D image data, the method further comprises:

comparing the 3D image data to the 2D image data; and
removing environmental features outside of the object from the 2D image data based on the 3D image data.

16. The method of claim 14, wherein before the identifying the scannable object using the 3D image data, the method further comprises:

comparing the 3D image data to the 2D image data; and
removing environmental features outside of the object from the 3D image data based on the 2D image data.

17. The method of claim 14, further comprising determining a second object identification of the object using the 3D image by:

determining one or more geometric features of the object from the 3D image data; and determining the second object identification from the one or more geometric features.

18. The method of claim 17, further comprising attempting to determine the object identification of the object using the 2D image data, wherein the determining the object identification of the object using the 2D image data comprises:

identifying a barcode for the object in the 2D image data; and decoding the barcode to generate barcode payload data and determining the object identification from the barcode payload data.

19. The method of claim 18, wherein the 3D image data includes a point cloud comprising a plurality of data points, each of the data points having a distance value associated with a distance from the 3D imaging apparatus, and wherein the determining the one or more geometric features of the object from the 3D image data is based on a first subset of the 3D image data and is not based on a second subset of the 3D image data, the first subset of the 3D image data being associated with a first subset of the data points having the respective distance value associated with the distance from the 3D imaging apparatus being within a predetermined range, the second subset of the 3D image data being associated with a second subset of the data points having the respective distance value associated with the distance from the 3D imaging apparatus being outside of the predetermined range.

* * * * *